(12) United States Patent
Sullivan et al.

(10) Patent No.: US 7,689,052 B2
(45) Date of Patent: Mar. 30, 2010

(54) MULTIMEDIA SIGNAL PROCESSING USING FIXED-POINT APPROXIMATIONS OF LINEAR TRANSFORMS

(75) Inventors: Gary J. Sullivan, Redmond, WA (US); Jian Lou, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 903 days.

(21) Appl. No.: 11/423,387

(22) Filed: Jun. 9, 2006

(65) Prior Publication Data

US 2007/0081734 A1   Apr. 12, 2007

Related U.S. Application Data

(60) Provisional application No. 60/724,505, filed on Oct. 7, 2005.

(51) Int. Cl.
*G06K 9/36* (2006.01)
(52) U.S. Cl. ..................................... 382/248
(58) Field of Classification Search ......... 382/232–253, 382/276–308; 375/240.01–240.27; 708/200–209, 708/400–409; 348/403–405, 395.1–420.1; 345/418–427; 704/200–223
See application file for complete search history.

(56) References Cited

U.S. PATENT DOCUMENTS

| | | | |
|---|---|---|---|
| 4,922,537 A * | 5/1990 | Frederiksen | ............... 704/212 |
| 5,168,375 A | 12/1992 | Reisch et al. | |
| 5,325,215 A | 6/1994 | Shibata et al. | |
| 5,357,594 A | 10/1994 | Fielder | |
| 5,379,351 A | 1/1995 | Fandrianto et al. | |
| 5,394,349 A * | 2/1995 | Eddy | ............... 708/401 |
| 5,416,604 A | 5/1995 | Park | |
| 5,430,556 A | 7/1995 | Ito et al. | |
| 5,559,557 A | 9/1996 | Kato | |
| 5,590,066 A | 12/1996 | Ohki | |
| 5,844,609 A * | 12/1998 | Filor et al. | ............ 375/240.01 |
| 5,864,637 A | 1/1999 | Liu et al. | |
| 5,970,173 A | 10/1999 | Lee et al. | |

(Continued)

FOREIGN PATENT DOCUMENTS

CA    2452343    1/2003

(Continued)

OTHER PUBLICATIONS

International Search Report and Written Opinion for PCT/US2008/054473, dated Aug. 14, 2008, 10 pages.

(Continued)

*Primary Examiner*—Sherali Ishrat
(74) *Attorney, Agent, or Firm*—Klarquist Sparkman, LLP

(57) ABSTRACT

Close approximations of ideal linear transforms, such as the forward and inverse discrete cosine transformation (DCT), are formed with minimum complexity using fixed-point arithmetic. The transformation is decomposed into a smaller set of transformations (e.g., the LLM decomposition of the DCT). The multiplication factors of the decomposition are then approximated by a fixed-point representation. However, instead of simply applying scaling and rounding operations to produce fixed-point approximations closest to the multiplication factors themselves, fixed-point multiplication factors are chosen that have the effect (after the cascaded operations of the various stages of decomposition) of being the closest feasible approximations of the entries in the resulting complete ideal transformation matrix.

21 Claims, 11 Drawing Sheets

U.S. PATENT DOCUMENTS

| | | | |
|---|---|---|---|
| 5,995,539 | A | 11/1999 | Miller |
| 6,002,801 | A | 12/1999 | Strongin et al. |
| 6,006,179 | A | 12/1999 | Wu et al. |
| 6,029,126 | A | 2/2000 | Malvar |
| 6,057,855 | A | 5/2000 | Barkans |
| 6,058,215 | A | 5/2000 | Schwartz et al. |
| 6,073,153 | A | 6/2000 | Malvar |
| 6,115,689 | A | 9/2000 | Malvar |
| 6,124,995 | A | 9/2000 | Kim |
| 6,137,916 | A | 10/2000 | Chang et al. |
| 6,154,762 | A | 11/2000 | Malvar |
| 6,301,304 | B1 | 10/2001 | Jing et al. |
| 6,324,560 | B1 | 11/2001 | Malvar |
| 6,356,870 | B1 | 3/2002 | Hui et al. |
| 6,363,117 | B1 | 3/2002 | Kok |
| 6,370,502 | B1 | 4/2002 | Wu et al. |
| 6,389,071 | B1 | 5/2002 | Wilson |
| 6,421,464 | B1 | 7/2002 | Tran et al. |
| 6,473,534 | B1 | 10/2002 | Merhav et al. |
| 6,487,574 | B1 | 11/2002 | Malvar |
| 6,496,795 | B1 | 12/2002 | Malvar |
| 6,507,614 | B1 | 1/2003 | Li |
| 6,600,785 | B1 | 7/2003 | Nishigori et al. |
| 6,606,725 | B1 | 8/2003 | Wang et al. |
| 6,687,726 | B1 | 2/2004 | Schneider |
| 6,694,342 | B1 | 2/2004 | Mou |
| 6,701,019 | B1 | 3/2004 | Wu et al. |
| 6,728,317 | B1 | 4/2004 | Demos |
| 6,831,951 | B2 | 12/2004 | Yamada |
| 6,882,685 | B2 | 4/2005 | Malvar |
| 6,944,224 | B2 | 9/2005 | Zhao et al. |
| 7,028,063 | B1 * | 4/2006 | Sarmaru et al. ............ 708/403 |
| 7,075,530 | B2 * | 7/2006 | D'Amora .................... 345/419 |
| 7,106,797 | B2 | 9/2006 | Malvar |
| 7,117,053 | B1 | 10/2006 | Absar et al. |
| 7,123,655 | B2 | 10/2006 | Kerofsky |
| 7,194,138 | B1 * | 3/2007 | Bright et al. ................ 382/248 |
| 7,197,525 | B2 * | 3/2007 | Stein et al. .................. 708/409 |
| RE40,081 | E | 2/2008 | Tran et al. |
| 2002/0013703 | A1 | 1/2002 | Matsumoto et al. |
| 2002/0154693 | A1 | 10/2002 | Demos et al. |
| 2003/0006916 | A1 | 1/2003 | Yakamizawa |
| 2003/0058940 | A1 | 3/2003 | Klein Gunnewiek et al. |
| 2005/0004964 | A1 | 1/2005 | Luo |
| 2005/0013365 | A1 | 1/2005 | Mukerjee et al. |
| 2005/0213659 | A1 | 9/2005 | Malvar |
| 2005/0213835 | A1 | 9/2005 | Guangxi et al. |
| 2006/0133481 | A1 | 6/2006 | Chujoh |
| 2007/0027677 | A1 | 2/2007 | Ouyang et al. |
| 2007/0196025 | A1 | 8/2007 | Tran et al. |
| 2007/0271321 | A1 * | 11/2007 | Reznik et al. ............... 708/402 |

FOREIGN PATENT DOCUMENTS

| | | |
|---|---|---|
| CN | 1452396 | 10/2003 |
| DE | 4133460 A1 | 4/1993 |
| EP | 854653 | 7/1998 |
| JP | 63-219066 | 9/1988 |
| JP | 04-282988 | 10/1992 |
| JP | 06-045948 | 2/1994 |
| JP | 06-045949 | 2/1994 |
| JP | 06-054307 | 2/1994 |
| JP | 09-008665 | 1/1997 |
| JP | 10-091614 | 4/1998 |
| JP | 2003-348598 | 12/2003 |
| WO | WO 0140985 | 6/2001 |

OTHER PUBLICATIONS

Adams et al., "Design of Reversible Subband Transforms Using Lifting," IEEE, pp. 489-492 (Aug. 1997).

Bruekers et al., "New Networks for Perfect Inversion and Perfect Reconstruction," *IEEE Journal on Selected Areas in Communications*, vol. 10, No. 1, pp. 130-137 (Jan. 1992).

Calderbank et al., "Lossless Image Compression Using Integer to Integer Wavelet Transforms," *IEEE*, 4 pp. (Oct. 1997).

Chan, "The Generalized Lapped Transform (GLT) for Subband Coding Applications," IEEE, pp. 1508-1511 (May 1995).

Fujiwara, "The Latest MPEG Textbook," pp. 146-147 (1994).

Ikehara et al., "Generalized Lapped Biorthogonal Transforms with Integer Coefficients," IEEE, pp. 886-890 (Oct. 1998).

Karp et al., "Biorthogonal Cosine-Modulated Filter Banks Without DC Leakage," *IEEE*, pp. 1457-1460 (May 1998).

Karp et al., "Efficient Prototype Filter Realizations for Cosine-Modulated Filter Banks," *Seizieme Colloque Gretsi*, pp. 551-554 (Sep. 1997).

Karp et al., "Lifting Schemes for Biorthogonal Modulated Filter Banks," *IEEE*, pp. 443-446 (Jul. 1997).

Malvar, "Biorthogonal and Nonuniform Lapped Transforms for Transform Coding with Reduced Blocking and Ringing Artifacts," IEEE, 29 pp. (Oct. 20, 1997).

Malvar, "Lapped Biorthogonal Transforms for Transform Codingwith Reduced Blocking and Ringing Artifacts," IEEE, 4 pp. (Apr. 1997).

Malvar, *Signal Processing with Lapped Transforms*, Chapter 5, "Modulated Lapped Transforms," pp. 175-218 (Jan. 1992).

Malvar et al., "The LOT: Transform Coding Without Blocking Effects," *IEEE Transactions on Acoustics, Speech, and Signal Processing*, vol. 37, No. 4, pp. 553-559 (Apr. 1989).

Nguyen et al., "Structures for M-Channel Perfect-Reconstruction FIR QMF Banks Which Yield Linear-Phase Analysis Filters," IEEE Transactions on Acoustics, Speech, and Signal Processing, vol. 38, No. 3, pp. 433-446 (Mar. 1990).

Oraintara et al., "Integer Fast Fourier Transform," IEEE Trans. on Signal Processing, vol. 50, No. 3, pp. 607-618 (Mar. 2002).

Sweldens, "The Lifting Scheme: A Custom-Design Construction of Biorthogonal Wavelets," 29 pp. (Nov. 1994).

Tian et al., "Dyadic Rational Biorthogonal Coifman Wavelet Systems," Technical Report CML TR 96-07, 50 pp. (Feb. 27, 1996).

Topiwala, "FastVDO Unified 16-Bit Framework," FastVDO LLC Powerpoint Presentation, 26 pp. (Jan. 2002).

Tran et al., "The Generalized Lapped Biorthogonal Transform," *IEEE*, pp. 1441-1444 (May 1998).

Tran, "The LIFTLT: Fast Lapped Transforms Via Lifting Steps," *IEEE*, vol. 2, pp. 745-748 (Oct. 1999).

Tran, "The LIFTLT: Fast Lapped Transforms via Lifting Steps," *IEEE Transactions on Signal Processing Letters*, vol. 7, Issue 6, pp. 145-148 (Jun. 2000).

U.S. Appl. No. 60/341,674, filed Dec. 2001, Lee et al.

U.S. Appl. No. 60/488,710, filed Jul. 2003, Srinivasan et al.

U.S. Appl. No. 60/501,081, filed Sep. 2003, Srinivasan et al.

U.S. Appl. No. 60/501,133, filed Sep. 2003, Holcomb et al.

Arai, et al., "A Fast DCT-SQ Scheme for Images," The Transactions of the IEICE, vol. E 71, No. 11, Nov. 1988, pp. 1095-1097.

Bjontegaard, "H.26L Test Model Long Term No. 8 (TML-8) Draft 0," *Video Coding Experts Group (VCEG)*, pp. 1-46.

Calderbank et al., "Wavelet Transforms that Map Integers to Integers," pp. 1-39 (Aug. 1996).

Cham, "Development of integer cosine transforms by the principle of dyadic symmetry," *Communications, Speech and Vision, IEEE Proceedings I* [see also IEEE Proceedings Communications], vol. 136 Issue: 4 , pp. 276 -282, Aug. 1989.

Chen et al., "A fast computational algorithm for the discrete cosine transform," *IEEE Trans. Commun.*, vol. 25, pp. 1004-1009, Sep. 1977.

Cooley et al., "An algorithm for the machine calculation of complex Fourier series," *Math. Computation*, vol. 19, pp. 297-301, 1965.

Hohl, "An 8×8 Discrete Cosine Transform Implementation on the TMS320C25 or the TMS320C30," *Texas Instruments Application Report SPRA115*, pp. 1-25 (1990) http://focus.ti.com/lit/an/spra115/spra115.pdf [Downloaded from the World Wide Web on Dec. 28, 2005].

Ishii et al., "Parallel Variable Length Decoding with Inverse Quantization for Software MPEG-2 Decoders," *IEEE Signal Processing Systems*, pp. 500-509 (1997).

ISO/IEC, "ISO/IEC 11172-2, Information technology—Coding of moving pictures and associated audio for digital storage media at up to about 1,5 Mbit/s—Part 2: Video," 112 pp. (1993).

ISO/IEC, "JTC1/SC29/WG11 N2202, Information Technology—Coding of Audio-Visual Objects: Visual, ISO/IEC 14496-2," 329 pp. (1998).

ITU-T, "ITU-T Recommendation H.261, Video Codec for Audiovisual Services at p × 64 kbits," 25 pp. (1993).

ITU-T, "ITU-T Recommendation H.262, Information Technology—Generic Coding of Moving Pictures and Associated Audio Information: Video," 205 pp. (1995).

ITU-T, "ITU-T Recommendation H.263, Video coding for low bit rate communication," 162 pp. (1998).

Jeong et al., "A Fast Algorithm Suitable for DCT Implementation with Integer Multiplication," *IEEE TENCON*, vol. 2, pp. 784-787 (1996).

Joint Video Team of ISO/IEC MPEG and ITU-T VCEG, "Final Joint Committee Draft of Joint Video Specification (ITU-T Recommendation H.264, ISO/IEC 14496-10 AVC," 206 pp. (Aug. 2002).

Li et al., "On Implementing Transforms from Integers to Integers," *Department of Electrical Engineering, Princeton University*, pp. 881-885, Jun. 1998.

Liang et al., "A 16-bit Architecture for H.26L, Treating DCT Transforms and Quantization," *Thirteenth Meeting*: Austin, Texas, USA, pp. 1-17 (Apr. 2001).

Liang et al., "Approximating the DCT with the Lifting Scheme: Systematic Design an Applications," *IEEE Conference Record of the 34th Asilomar Conference*, vol. 1, pp. 192-196 (Oct. 2000).

Liang et al., "Fast multiplierless approximations to the DCT with the lifting scheme", IEEE Trans on Signal Processing, vol. 49, No. 12, 2001.

Loeffler et al., "Practical fast 1-D DCT algorithms with 11 multiplications," *Proc. IEEE ICASSP*, vol. 2, pp. 988-991, Feb. 1989.

Malvar, "Fast computation of the discrete cosine transform and the discrete Hartley transform," *IEEE Trans. Acoust., Speech, Signal Processing*, vol. ASSP-35, pp. 1484-1485, Oct. 1987.

Malvar, "Low-complexity Length-4 Transform and Quantization with 16-bit Arithmetic," *Proposal, ITU Study Group 16 Question 6 Video Coding Experts Group*, 24 pp., 14th Meeting held Sep. 24-27, 2001, Santa Barbara, CA.

Microsoft Corporation, "Microsoft Debuts New Windows Media Player 9 Series, Redefining Digital Media on the PC," 4 pp. (Sep. 4, 2002) [Downloaded from the World Wide Web on Jul. 16, 2004].

Mook, "Next-Gen Windows Media Player Leaks to the Web," BetaNews, 18 pp. (Jul. 19, 2002) [Downloaded from the World Wide Web on Mar. 16, 2004].

Pei et al., "The Integer Transforms Analogous to Discrete Trigonometric Transforms," *IEEE Transactions on Signal Processing*, vol. 48, No. 12, pp. 3345-3364 (Dec. 2000).

Printouts of FTP directories from http://ftp3.itu.ch , 8 pp. (downloaded from the World Wide Web on Sep. 20, 2005.).

Reader, "History of MPEG Video Compression—Ver. 4.0," 99 pp., document marked Dec. 16, 2003.

Rubino et al., "Improved Chen-Smith Image Coder," *Electrical Engineering Department, Iniversity of Texas at Arlington*, pp. 267-270, 1993.

Shao, "Implementing JPEG with TMS320C2xx Assembly Language Software," *Texas Instruments Application Report SPRA615*, pp. 1-48 (Jan. 2000) http://focus.ti.com/lit/an/spra615/spra615.pdf [Downloaded from the World Wide Web on Dec. 28, 2005].

Sriram et al., "MPEG-2 Video decoding on the TMS320C6X DSP Architecture," *IEEE Conference Record on the 32nd Asilomar Conference*, vol. 2, pp. 1735-1739 (1998).

Sullivan et al., "The H.264/AVC Advanced Video Coding Standard: Overview and Introduction to the Fidelity Range Extensions," 21 pp. (Aug. 2004).

Tran, "The BinDCT: Fast Multiplierless Approximation of the DCT," *IEEE Signal Processing Letters*, vol. 7, No. 6, pp. 141-144 (Jun. 2000).

Wien, "Variable Block-Size Transforms for Hybrid Video Coding," Dissertation, 182 pp. (Feb. 2004).

"B.H.A. Corporation Introduces The XVD™ Media Platform," Press Release dated Apr. 24, 2003, 2 pages.

Golston, "Comparing Media Codecs for Video Content," Embedded Systems Conference, 2004, 18 pages.

Johanson, "SIRAM—Scalable Internet Real-time Media Project Report," undated, 11 pages.

Loomis et al., "VC-1 Technical Overview," Apr. 2006, 5 pages.

Official Notice of Final Rejection dated Apr. 21, 2009, from Japanese Patent Application No. 2006-279187, 3 pp.

Official Notice of Final Rejection dated Apr. 21, 2009, from Japanese Patent Application No. 2006-279189, 3 pp.

Official Notice of Final Rejection dated Apr. 21, 2009, from Japanese Patent Application No. 2006-322322, 3 pp.

\* cited by examiner

Software 1180 Implementing Encoder/
Decoder and Fixed-point Approximation
Transform

MULTIMEDIA SIGNAL PROCESSING USING FIXED-POINT APPROXIMATIONS OF LINEAR TRANSFORMS

RELATED APPLICATIONS

This application claims priority from U.S. Provisional Patent Application No. 60/724,505, filed Oct. 7, 2005.

BACKGROUND

Linear Transforms in Multimedia Signal Processing

A common problem in the design of multimedia signal processing systems, e.g., for image, video and audio coding, is the implementation of an approximation of a linear transformation which may form a processing block or part of a processing block in a multimedia processing system.

For example, the discrete cosine transform (DCT) is used for spatial-domain signal compaction in image and video coding. Similar transformations known as Modified DCT (MDCT) or Lapped Orthogonal Transforms, are often used in audio coding. Other well-known transformations include the Fourier Transformation, the family of transforms known as W transformations, and many others. Linear transforms may also be part of other processes.

Often the transform is designed as an approximation of a set of ideal transformation equations. A linear transformation can be expressed as follows. Given a column vector x of input samples, a linear transformation process can be expressed as the performance of multiplication of the input vector by a transformation matrix T. to form a set of output samples y=T*x following ordinary mathematical principles known as linear algebra.

FIG. 1 illustrates an example of a two-dimensional transformation 300 applied to an n×m input data block 120 to produce an n×m output data block 130. In applications such as video coding, the input data block represents picture elements (pixels) sampled at regular spatial intervals of an image, and is therefore referred to as a representation of the data in the spatial domain. The output block is said to represent the data in the transform domain. An inverse transformation 110 reverses the transformation 100, reconstructing the original data from the output block 130.

In some cases, as in image and video coding, a two-dimensional transformation is employed and the ideal transformation is separable, meaning that it can be decomposed into independent transformations to be applied to the rows and columns of a two-dimensional input array X to result in a two-dimensional matrix of output samples Y. In such a case, the transformation can be expressed as $Y = T_C * X * T_R^T$, where $T_C$ is transformation matrix applied to the columns of X and $T_R$ is a transformation matrix applied to the rows of X.

Transformation matrices may be either square or rectangular. A block-wise transformation refers to segmenting input data into a number of separate blocks and applying a transformation to each block. In some cases the transformation processes may be applied to overlapping sets of input data to produce what is known as an overlapped block transform.

The same concepts can be applied to extend the analysis to higher dimensions, for example to perform a transformation to be applied to video data both spatially and temporally, forming a three-dimensional transformation process.

For an arbitrary matrix T containing M columns and N rows with arbitrary elements, the number of multiplications necessary to implement the transformation process would be M*N, and the number of addition or subtraction operations would be (M−1)*N. In some cases the direct application of a matrix multiplication operation for the computation of the transformation may require an excessive amount of computation processing resources.

Decomposition of Transforms

A common approach to reducing the computation processing cost of a transformation is to decompose the transformation into a cascade of simpler transformation processes. Here, the term "simpler" is used to refer to something that is less "complex." The term "complex" as used herein refers to the quantity of computational resources required to perform a specific task. This may include various such issues as:

Storage requirements for data and computer instructions

Precision requirements for arithmetic operations

The number and type of arithmetic operations (e.g., considering additions and subtractions as less complex than multiplications, which may in turn be considered less complex than divisions, etc.)

Quantity, latency, and speed requirements for memory accesses

Impact on cache data flow in cache-oriented architectures for instructions and data processing A significant amount of research has been performed toward finding low-complexity decompositions of well-known transformation processes. In some cases, the reason a particular idealized transformation is used in the system is the fact that it is known that lower-complexity decompositions exist to help compute it. For example, it is common in image and video compression applications to use a discrete cosine transform (DCT) rather than a Karhunen-Loeve transform (KLT) because it is known that the DCT can be decomposed easily while the KLT, in general, cannot.

Two-Dimensional IDCT and DCT Definitions

The ideal real-valued block-wise inverse DCT (also known as an IDCT or a type-III DCT, unitary or orthonormal formulation) for an M×N block of inverse-quantized transform coefficients $\hat{F}_{m,n}[v,u]$ at position [nN][mM] in a picture can be defined as follows:

$$\hat{f}[nN+y][mM+x] = \sum_{u=0}^{M-1} \sum_{v=0}^{N-1} \left( c_u \sqrt{\frac{2}{M}} \right) \left( c_v \sqrt{\frac{2}{N}} \right) \hat{F}_{m,n}[v][u] \cdot \cos\left[\frac{(2x+1)u\pi}{2M}\right] \cdot \cos\left[\frac{(2y+1)v\pi}{2N}\right]$$

for x=0 . . . M and y=0 . . . N.

In typical applications, such as the ITU video coding standards known as H.261, H.262, and H.263 and the ISO/IEC video coding standards known as MPEG-1 video, MPEG-2 video, and MPEG-4 visual, the input to the IDCT has integer values and the decoded output samples are required to have integer values. Therefore, rather than considering the ideal IDCT result in a decoder to be the closest approximation of the above equation, the ideal result of the decoding process is considered to be the result obtained by rounding the output of the above equation to the nearest integer value (with rounding away from zero for values that are exactly half-integers).

The ideal real-valued forward DCT (also known as an FDCT or a type-II DCT, unitary or orthonormal formulation) for an M×N block of spatial-domain samples f[nN+y][mM+x] at position [nN][mM] in a picture can be defined as follows:

$$F_{m,n}[v][u] = \sum_{x=0}^{M-1} \sum_{y=0}^{N-1} \left(c_u \sqrt{\frac{2}{M}}\right)\left(c_v \sqrt{\frac{2}{N}}\right)$$

$$f[nN+y][mM+x] \cdot \cos\left[\frac{(2x+1)u\pi}{2M}\right] \cdot \cos\left[\frac{(2y+1)v\pi}{2N}\right]$$

for u=0 ... M and v=0 ... N.

In applications such as the above-listed ITU and ISO/IEC video coding standards, the input to the forward DCT would be an integer and the representation of the transform coefficient values at the output of the inverse quantization process in the decoder uses integer values.

The constants used in these equations are defined as follows:

$c_u = 1/\sqrt{2}$ for u=0, otherwise 1.

$c_v = 1/\sqrt{2}$ for v=0, otherwise 1.

In the ITU and ISO/IEC standards relevant to this discussion, both M and N are typically equal to 8.

The LLM Decomposition for IDCT and DCT

The signal flow diagram in FIG. 2 shows a decomposition of a one-dimensional 8-input inverse DCT in a decomposition manner known as the Loeffler, Ligtenberg, and Moschytz (LLM) decomposition. (See, C. Loeffler, A. Ligtenberg, and G. S. Moschytz, "Practical fast 1-D DCT algorithms with 11 multiplications", Proc. IEEE Intl. Conf on Acoust., Speech, and Signal Proc. (ICASSP), vol. 2, pp. 988-991, February 1989.) A very similar form of decomposition (not shown) can also be applied to produce a forward DCT computation. There are actually a couple of variations of the LLM decomposition, where this shows one particular variant in which the signal flow from left to right never involves more than a single multiplication operator. The illustrated decomposition uses 14 multiplication operators, in contrast to straightforward application of the inverse DCT process which would require 64 multiplications.

Note also that if the overall magnitude of the data flowing in the diagram can be scaled by a constant factor that is under the control of the designer, a scale factor of 1/sqrt(8) can be incorporated into that constant factor and the number of remaining multiplication operations can be reduced from 14 to 12.

When performing a two-dimensional IDCT or DCT operation, the scale factor of 1/sqrt(8) for each stage can be incorporated into an overall scale factor of 1/8. This is a very simple factor in the sense that it is an integer power of two. Thus, it can be represented in fixed-point arithmetic using an operator known as an arithmetic shift operator.

A number of other well-known decompositions exist for DCT and IDCT computation. These include methods known as Chen-Wang, Wang, AAN (Arai, Agui, and Nakajima), etc.

Fixed Point Approximation Techniques

One way to ease the computational burden of performing a transformation is the use of fixed-point arithmetic. This consists essentially of two techniques: rounding and scaling. Sometimes clipping is also employed.

The ideal values of the multipliers that are found in a transformation matrix are often not integers. In fact, they are often not even rational numbers, so exact computations are not feasible. For example, general-purpose computer arithmetic would typically not have a way to exactly represent a number such as 1/sqrt(8) or cos(π/4). A typical technique is to scale the data by some constant value and round the result to some value equivalent to an integer. Alternatively, a fixed-length representation with a "decimal point" or "binary point" understood to be in a certain position can be used. The use of such data structures that are equivalent to using integers to process the data is referred to as the use of fixed-point arithmetic, a term well-known in the art.

For example, to represent the number 1/sqrt(8) we may scale up the number by a multiplication factor of $2^{15}$, and round the value of $2^{15}$/sqrt(8) to the nearest integer representation, which would be 11585. Then to multiply an input number x by 1/sqrt(8), we can instead multiply it by 11585. The result would then need to be scaled back down by dividing it by $2^{15}$ when interpreting the answer, resulting in the approximation value 0.353546142578125 for the actual value which is the irrational number 0.3535533905932737622 .... Such a computation method would not produce an exact result, but it would produce a result that is close to the correct value.

Typically, when rounding a multiplication factor to an integer, the nearest integer to the ideal value would be used.

A typical technique for fixed point approximation of a transformation would then consist of the following:

1. Decomposing the transformation into a smaller set of transformations.
2. Approximating each multiplication factor by a fixed-point representation such as an integer by scaling up the ideal value of the multiplication factor and rounding it to the nearest integer (or fixed-point approximation).

Scaling and rounding operations may also be applied to the input data and to the computed results to adjust the number of bits of precision needed at various points in the processing.

To avoid values that go out of the range of data that can be properly represented using the implemented computer arithmetic, an operation called clipping may be performed that consists of saturating a computed value to fall within some upper and/or lower bound.

In a typical application of a direct implementation of a non-decomposed matrix multiply transformation, the value chosen for the approximation of a multiplication factor by an integer should be the ideal value rounded to the nearest integer after scaling, as it is easily shown that this will produce the most accurate computed result for most purposes.

Application of Fixed Point Approximation to LLM ICDT

An example of this typical approach being applied is found in a publicly-available "IJG" (Independent JPEG Group) software implementation of the LLM IDCT decomposition, shown in FIG. 3.

In this diagram (and in the IJG software), the overall scale factor of 1/sqrt(8) is assumed to be applied in a manner external to the flow diagram as shown and an additional overall scale factor of $1/2^{13}$ is also assumed to be applied (conceptually or in actual fact) externally to compensate for the magnification of the multiplication factors used to allow their representation in integer values. The $2^{13}$ scale factor that magnifies the multiplication factors is evident in the use of the 13-bit left shift operations that are applied along pathways shown in the top left area of the flow diagram.

SUMMARY

The following Detailed Description concerns the design of a close approximation of an ideal linear transformation process with minimum complexity using fixed-point arithmetic. In one particular example, the design of an approximate forward and inverse discrete cosine transformation (DCT) processes using practical-word-length fixed-point arithmetic is presented. The principles and concepts presented are directed more generally toward the goal of designing an approximate computational equivalent to an ideal linear transformation process such that "complexity" is minimized for implementation on target computer processing components, and precision is maximized.

More particularly, an improved approach to designing precise, low complexity approximations of ideal transformations further considers cascaded rounding effects. Rather than simply forming the approximation by rounding the ideal values that would be used as the multiplication factor in a corresponding infinite-precision flow diagram that uses the same decomposition, this approach seeks to choose fixed-point multiplication factors that have the effect (after the cascaded operations of the various stages of decomposition) of being the closest feasible approximations of the entries in the resulting complete ideal transformation matrix.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following description relates to implementations of fixed-point approximations of linear transformations, and their application in multimedia signal processing systems (e.g., image, video and audio coding). Although the following description illustrates the fixed-point approximation considering cascaded effects approach applied to various examples of the LLM IDCT/DCT transformation, it should be understood that this fixed-point approximation approach also can be applied to other transformation implementations, such as the Chen-Wang, Wang, and AAN decompositions of the DCT/IDCT transformation, as well as other transformations.

1. Variations of the Fixed-Point Approximation to the LLM IDCT

Figure 3:
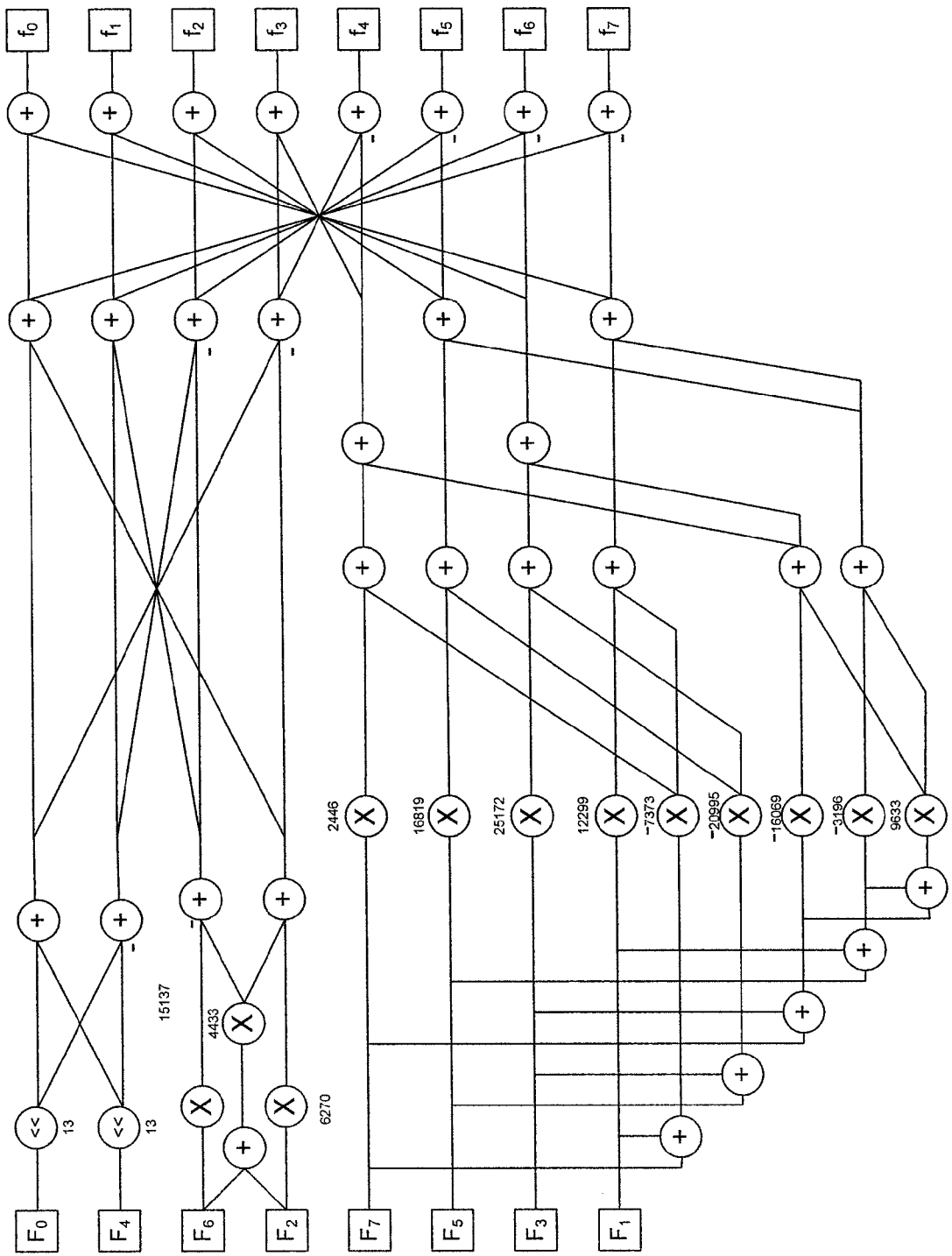
FIG. 3 is a signal flow diagram of a fixed point approximation of the LLM decomposition of a one-dimensional 8-input inverse DCT using signed 16 bit multipliers (represented in the drawing as integers), as is known in the prior art.
Figure 4:
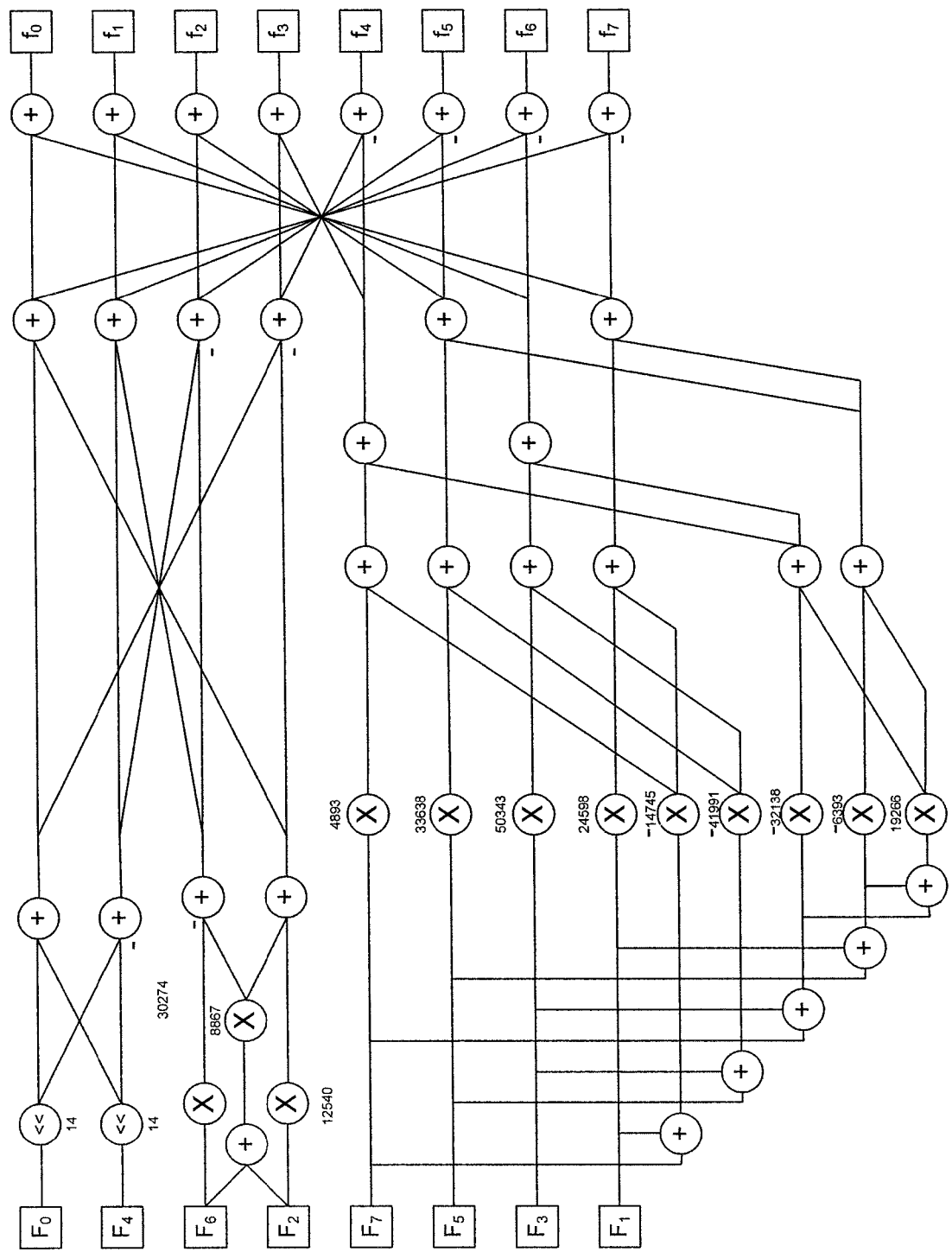
FIG. 4 is a signal flow diagram of a variation to the fixed point approximation of the LLM decomposition of a one-dimensional 8-input inverse DCT using signed 17-bit multipliers (represented in the drawing as integers) for enhanced accuracy.

FIG. 4 illustrates a variation of the fixed-point approximation of the LLM IDCT in FIG. 3. In this variation, the accuracy of the approximation is enhanced by using an additional factor of two of pre-scaling before rounding the multiplication factors to the nearest integer. This use of a larger pre-scaling factor before rounding the multiplication factors to the nearest integer increases the average overall precision of the computed results.

When making this adjustment, we note that the multiplication factors now require more than 16 bits of precision for their two's complement integer representation. When performing fixed-point computer calculations, it is typical to constrain the required precision for various points in the processing to lie within integer multiples of 8 bits. In this case, increasing the precision of the multiplication factors may appear to harm implementation complexity by requiring 17 bits for multiplication factor storage and for performing the multiplication operation.

Figure 5:
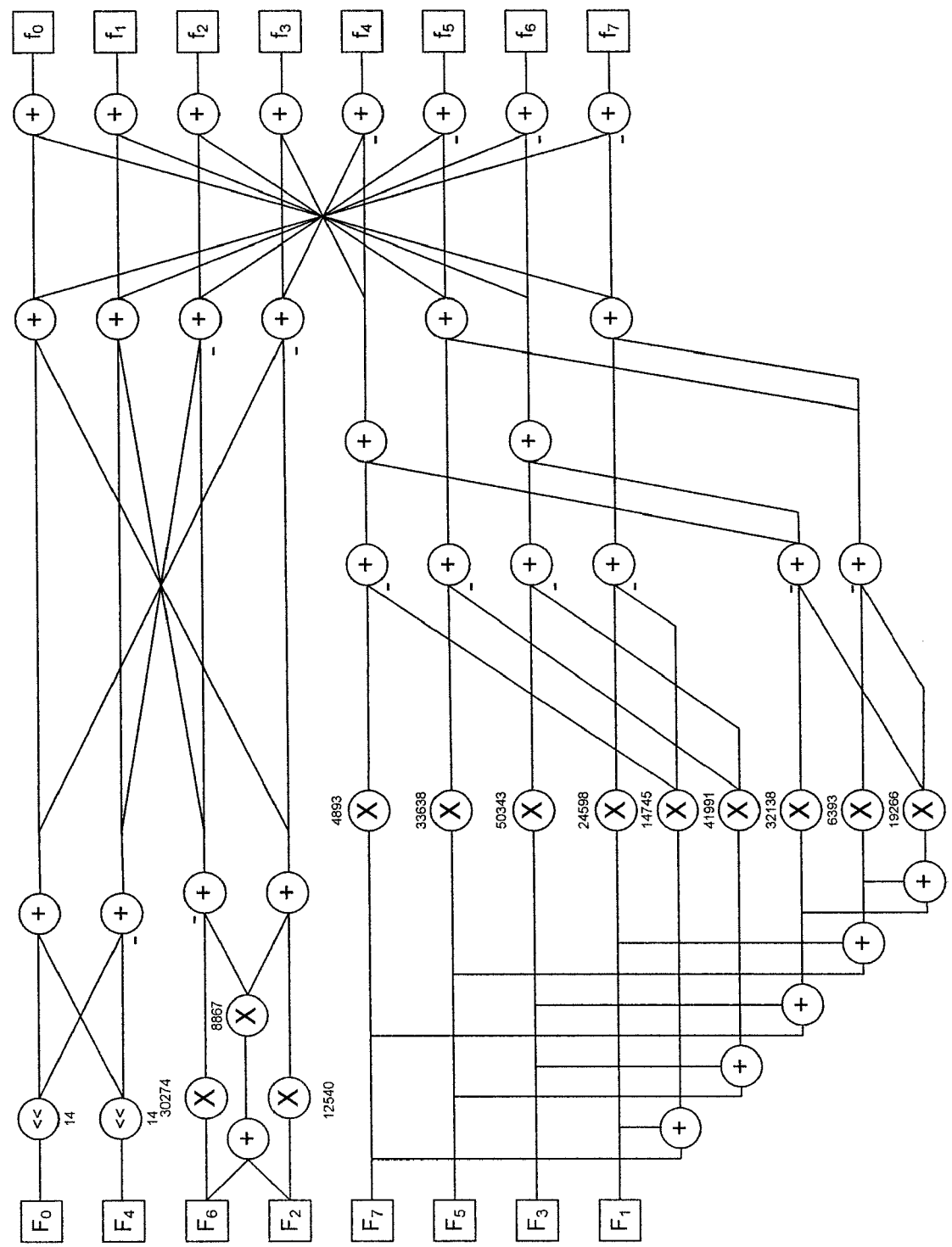
FIG. 5 is a signal flow diagram of a further variation to the fixed point approximation of the LLM decomposition of a one-dimensional 8-input inverse DCT using unsigned 16-bit multipliers.

However, this problem can, in some implementation scenarios, be avoided by using unsigned integers to store the absolute values of the multiplication factors rather than using two's complement integers to represent them. The negation effect of the sign of the multiplication factor can then be applied as part of the subsequent add/subtract processes that follow the multiplication factors, as shown in FIG. 5. It is clear, from examination of the operations found in the figures, that the results produced with the two variations of the fixed-point approximation to the LLM IDCT shown in FIGS. 4 and 5 are numerically identical.

2. Fixed-Point Approximation Considering Cascaded Rounding Effects

Figure 6:
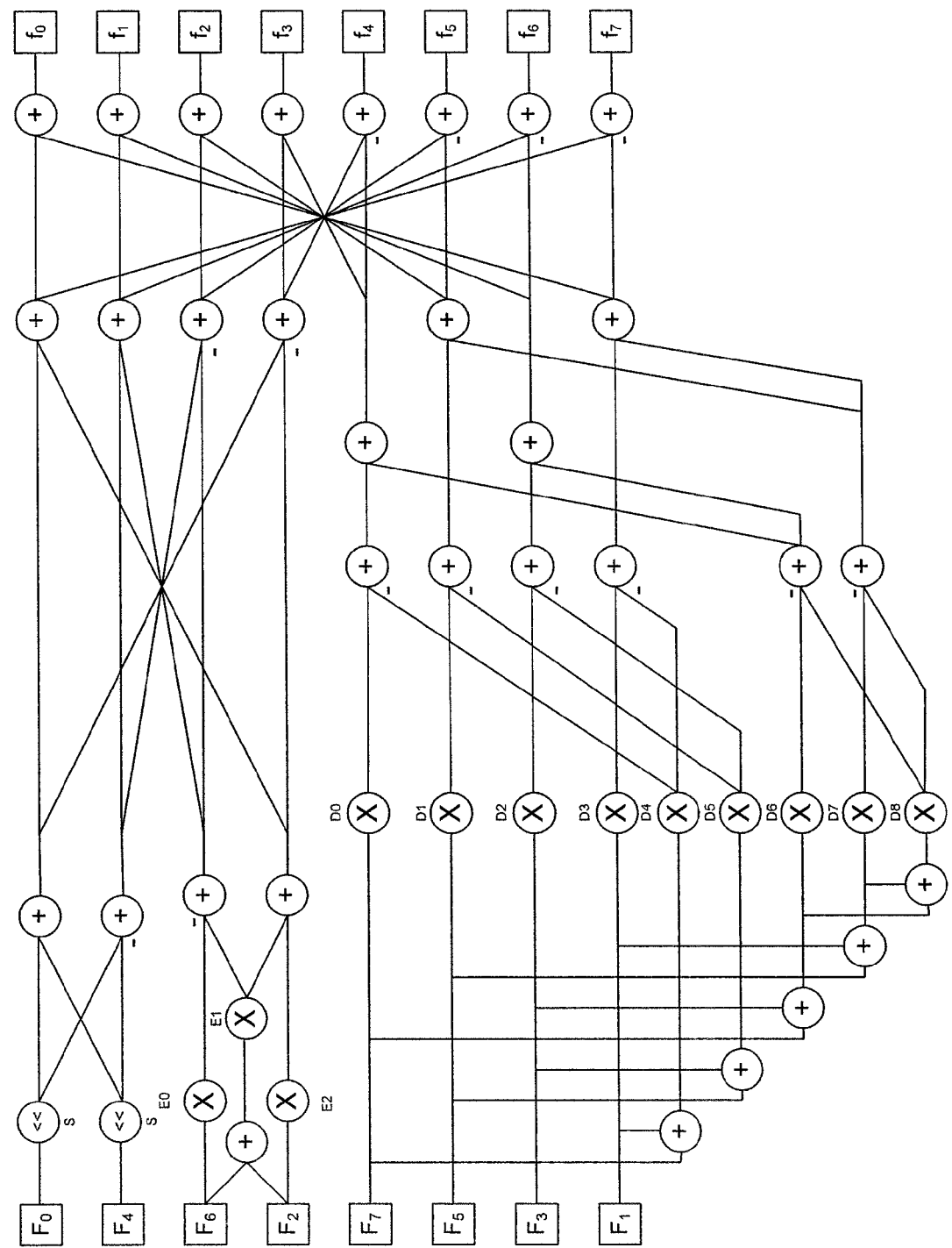
FIG. 6 is a signal flow diagram of a generalized fixed point approximation of the LLM decomposition of a one-dimensional 8-input inverse DCT.

FIG. 6 illustrates a generalized form of the fixed-point approximation of the LLM IDCT transformation, such as the variations shown in FIGS. 3, 4 and 5. The differences between these variations, in terms of mathematical results, can then be described in terms of the amount of the shifting that is applied, as shown in FIG. 6 by the value of S, and the values of the multiplication factors, as shown in FIG. 6 by the values of E0 through E2 and D0 through D8.

In FIG. 6, the multiplication factors are shown separated into two categories; i.e., into E0 through E2 and D0 through D8. This is because the influence of the multiplication factors in each of these two categories on the values of the final results of the computation is independent of the influence of the multiplication factors in the other category.

In cases where the transformation to be performed has been decomposed into a cascade of simpler transformations, however, we have found that the approximation that results, in regard to approximation of the elements of the original complete transformation matrix T, is sometimes not ideal when the multiplication factors of the simpler component transformations were produced by separately generating each of them as the nearest integer rounded value relative to the ideal value of a similarly-decomposed component transformation without application of the rounding.

Our approach to designing an improved approximation is to approach the problem of approximation of the multiplication factors differently. Rather than simply forming them by rounding the ideal values that would be used as the multiplication factor in a corresponding infinite-precision flow diagram that uses the same decomposition, we seek to choose fixed-point multiplication factors that have the effect (after the cascaded operations of the various stages of decomposition) of being the closest feasible approximations of the entries in the resulting complete ideal transformation matrix. In short summary, this improved approach improves the fixed-point approximation of a transformation by further considering cascaded rounding effects.

This approach can be applied to further improve the fixed-point approximation LLM IDCT shown in FIG. 3 (wherein S=13). In this example (First Example Approximation), the scaling factor is chosen to be:

$$S=13,$$

and the values of the multiplication factors are chosen as follows:

$$\begin{bmatrix} E0 \\ E1 \\ E2 \end{bmatrix} = \begin{bmatrix} 15136 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16820 \\ 25172 \\ 12300 \\ 7373 \\ 20996 \\ 16069 \\ 3197 \\ 9633 \end{bmatrix}.$$

This is found to produce better results than the fixed-point approximation shown in FIG. 3, in which the multiplication factors are:

$$\begin{bmatrix} E0 \\ E1 \\ E2 \end{bmatrix} = \begin{bmatrix} 15137 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16819 \\ 25172 \\ 12299 \\ 7373 \\ 20995 \\ 16069 \\ 3196 \\ 9633 \end{bmatrix}.$$

Note that the only differing aspect, in terms of mathematical results, between this First Example Approximation (considering cascaded effects approach) and that shown in FIG. 3, is the value of some of the integerized multiplication factors. Specifically, the values of E0, D1, D3, D5, and D7 differ from the absolute values of the multiplication factors shown in FIG. 3.

The First Example Approximation (considering cascaded effects approach) produces more accurate results, on average, as an approximation of the ideal IDCT transformation than the approximation shown in FIG. 3. Well-known accuracy measurement techniques, such as the mean-square-error results found by the IDCT accuracy measurement methods defined in the following documents can be used to measure the superiority of the approximation.

ITU-T Recommendation H.261 Annex A

ITU-T Recommendation H.263 Annex A

The former ANSI/IEEE standard 1180-1990

The draft ISO/IEC MPEG international standard 23002-1 (which was made publicly available as an attachment to an MPEG call for proposals for fixed point IDCT and DCT approximation methods).

The same approach (considering cascaded effects approach) also can be applied to the fixed-point approximation variations shown in FIGS. 4 and 5 (which have mathematically identical results and which use S=14) to produce a further example approximation (Second Example Approximation). The Second Example Approximation is defined as follows.

$$S=14$$

$$\begin{bmatrix} E0 \\ E1 \\ E2 \end{bmatrix} = \begin{bmatrix} 30274 \\ 8867 \\ 12540 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 4894 \\ 33638 \\ 50344 \\ 24598 \\ 14746 \\ 41991 \\ 32139 \\ 6393 \\ 19266 \end{bmatrix}.$$

This is found to produce better results than the fixed-point approximation shown in FIGS. 4 and 5, in which the multiplication factors are:

$$\begin{bmatrix} E0 \\ E1 \\ E2 \end{bmatrix} = \begin{bmatrix} 30274 \\ 8867 \\ 12540 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 4893 \\ 33638 \\ 50343 \\ 24598 \\ 14745 \\ 41991 \\ 32138 \\ 6393 \\ 19266 \end{bmatrix}.$$

In this case, we note that the second Example Approximation uses the same values for E0 through E2 as the corresponding unimproved approximation variations shown in FIGS. 4 and 5, although the values of D0 through D8 are different. Thus the considering cascaded effects approach only improves the "odd" part of the transform structure in this case.

Although the First and Second Example Approximations using the considering cascaded effects approach would be a good design with high accuracy (accuracy conforming to the former IEEE 1180 standard) for implementation on general-purpose CPUs and on many digital signal processors (DSPs), reducing the dynamic range of the calculations may be beneficial in some scenarios (such as custom-hardware implementations). We thus describe the following additional example approximations designed according to the same principles, showing the values of the selected multiplication factors in contrast with those produced by the prior fixed-point approximation technique (described in the Background and shown in FIG. 3).

The Third Example Approximation also conforms to the generalized flow structure shown in FIG. 6, and uses the following constants:

S=12

$$\begin{bmatrix} E0 \\ E1 \\ E2 \end{bmatrix} = \begin{bmatrix} 7569 \\ 2217 \\ 3135 \end{bmatrix}$$

which produces better results than $$\begin{bmatrix} E0 \\ E1 \\ E2 \end{bmatrix} = \begin{bmatrix} 7568 \\ 2217 \\ 3135 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 1223 \\ 8409 \\ 12585 \\ 6149 \\ 3686 \\ 10497 \\ 8034 \\ 1598 \\ 4816 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 1223 \\ 8410 \\ 12586 \\ 6149 \\ 3686 \\ 10498 \\ 8035 \\ 1598 \\ 4816 \end{bmatrix}.$$

The Fourth Example Approximation again conforms to the generalized flow structure shown in FIG. 6, and uses the following constants:

S=11

$$\begin{bmatrix} E0 \\ E1 \\ E2 \end{bmatrix} = \begin{bmatrix} 3784 \\ 1108 \\ 1568 \end{bmatrix}$$

which produces better results than $$\begin{bmatrix} E0 \\ E1 \\ E2 \end{bmatrix} = \begin{bmatrix} 3784 \\ 1108 \\ 1567 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 611 \\ 4205 \\ 6293 \\ 3075 \\ 1843 \\ 5249 \\ 4017 \\ 799 \\ 2408 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 612 \\ 4205 \\ 6293 \\ 3075 \\ 1843 \\ 5249 \\ 4017 \\ 799 \\ 2408 \end{bmatrix}.$$

The considering cascaded effects approach described above can provide approximations (e.g., the First through Fourth Examples just described) that have sufficient precision to conform to the former IEEE 1180 standard. Solutions for smaller and smaller values of S become less accurate. When the value of S becomes very small, the transform design may be less useful. However, we provide additional solutions below for the sake of completeness and because they may be useful in some applications that demand less precision.

The Fifth Example Approximation again conforms to the generalized flow structure shown in FIG. 6, and uses the following constants:

S=10

$$\begin{bmatrix} E0 \\ E1 \\ E2 \end{bmatrix} = \begin{bmatrix} 1892 \\ 554 \\ 784 \end{bmatrix}$$

which is the same as $$\begin{bmatrix} E0 \\ E1 \\ E2 \end{bmatrix} = \begin{bmatrix} 1892 \\ 554 \\ 784 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 306 \\ 2102 \\ 3146 \\ 1536 \\ 921 \\ 2624 \\ 2009 \\ 399 \\ 1204 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 306 \\ 2102 \\ 3146 \\ 1537 \\ 922 \\ 2624 \\ 2009 \\ 400 \\ 1204 \end{bmatrix}.$$

The Sixth Example Approximation again conforms to the generalized flow structure shown in FIG. 6, and uses the following constants:

S=9

$$\begin{bmatrix} E0 \\ E1 \\ E2 \end{bmatrix} = \begin{bmatrix} 946 \\ 277 \\ 392 \end{bmatrix}$$

which is the same as $$\begin{bmatrix} E0 \\ E1 \\ E2 \end{bmatrix} = \begin{bmatrix} 946 \\ 277 \\ 392 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 153 \\ 1051 \\ 1573 \\ 769 \\ 461 \\ 1312 \\ 1004 \\ 200 \\ 602 \end{bmatrix}$$

which is the same as $$\begin{bmatrix} D0 \\ D1 \\ D2 \\ D3 \\ D4 \\ D5 \\ D6 \\ D7 \\ D8 \end{bmatrix} = \begin{bmatrix} 153 \\ 1051 \\ 1573 \\ 769 \\ 461 \\ 1312 \\ 1004 \\ 200 \\ 602 \end{bmatrix}.$$

The Seventh Example Approximation again conforms to the generalized flow structure shown in FIG. 6, and uses the following constants:

S=8

$$\begin{bmatrix} E0 \\ E1 \\ E2 \end{bmatrix} = \begin{bmatrix} 473 \\ 139 \\ 195 \end{bmatrix}$$

which produces better results than $$\begin{bmatrix} E0 \\ E1 \\ E2 \end{bmatrix} = \begin{bmatrix} 473 \\ 139 \\ 196 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 76 \\ 526 \\ 786 \\ 384 \\ 230 \\ 656 \\ 502 \\ 100 \\ 301 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 76 \\ 526 \\ 787 \\ 384 \\ 230 \\ 656 \\ 502 \\ 100 \\ 301 \end{bmatrix}.$$

The Eighth Example Approximation again conforms to the generalized flow structure shown in FIG. 6, and uses the following constants:

$S=7$ $$\begin{bmatrix} E0 \\ E1 \\ E2 \end{bmatrix} = \begin{bmatrix} 236 \\ 69 \\ 98 \end{bmatrix}$$

which produces better results than $$\begin{bmatrix} E0 \\ E1 \\ E2 \end{bmatrix} = \begin{bmatrix} 237 \\ 69 \\ 98 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 39 \\ 263 \\ 395 \\ 193 \\ 116 \\ 329 \\ 252 \\ 50 \\ 151 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 38 \\ 263 \\ 393 \\ 192 \\ 115 \\ 328 \\ 251 \\ 50 \\ 151 \end{bmatrix}.$$

The Ninth Example Approximation again conforms to the generalized flow structure shown in FIG. 6, and uses the following constants:

$S=6$ $$\begin{bmatrix} E0 \\ E1 \\ E2 \end{bmatrix} = \begin{bmatrix} 119 \\ 35 \\ 49 \end{bmatrix}$$

which produces better results than $$\begin{bmatrix} E0 \\ E1 \\ E2 \end{bmatrix} = \begin{bmatrix} 118 \\ 35 \\ 49 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 18 \\ 132 \\ 196 \\ 96 \\ 57 \\ 164 \\ 125 \\ 25 \\ 75 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 19 \\ 131 \\ 197 \\ 96 \\ 58 \\ 164 \\ 126 \\ 25 \\ 75 \end{bmatrix}.$$

$$\begin{bmatrix} E0 \\ E1 \\ E2 \end{bmatrix} = \begin{bmatrix} 59 \\ 17 \\ 25 \end{bmatrix}$$

which produces better results than $$\begin{bmatrix} E0 \\ E1 \\ E2 \end{bmatrix} = \begin{bmatrix} 59 \\ 17 \\ 24 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 10 \\ 66 \\ 98 \\ 48 \\ 29 \\ 82 \\ 63 \\ 13 \\ 38 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 10 \\ 66 \\ 98 \\ 48 \\ 29 \\ 82 \\ 63 \\ 12 \\ 38 \end{bmatrix}.$$

The Eleventh Example Approximation again conforms to the generalized flow structure shown in FIG. 6, and uses the following constants:

$S=4$ $$\begin{bmatrix} E0 \\ E1 \\ E2 \end{bmatrix} = \begin{bmatrix} 30 \\ 9 \\ 12 \end{bmatrix}$$

which is the same as $$\begin{bmatrix} E0 \\ E1 \\ E2 \end{bmatrix} = \begin{bmatrix} 30 \\ 9 \\ 12 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 6 \\ 32 \\ 50 \\ 24 \\ 15 \\ 41 \\ 32 \\ 6 \\ 19 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 5 \\ 33 \\ 49 \\ 24 \\ 14 \\ 41 \\ 31 \\ 6 \\ 19 \end{bmatrix}.$$

The Twelfth Example Approximation again conforms to the generalized flow structure shown in FIG. 6, and uses the following constants:

$S=3$ $$\begin{bmatrix} E0 \\ E1 \\ E2 \end{bmatrix} = \begin{bmatrix} 14 \\ 4 \\ 6 \end{bmatrix}$$

which produces better results than $$\begin{bmatrix} E0 \\ E1 \\ E2 \end{bmatrix} = \begin{bmatrix} 15 \\ 4 \\ 6 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2 \\ 16 \\ 24 \\ 12 \\ 7 \\ 20 \\ 15 \\ 3 \\ 9 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 2 \\ 16 \\ 25 \\ 12 \\ 7 \\ 21 \\ 16 \\ 3 \\ 9 \end{bmatrix}.$$

The Thirteenth Example Approximation again conforms to the generalized flow structure shown in FIG. 6, and uses the following constants:

S=2

$$\begin{bmatrix} E0 \\ E1 \\ E2 \end{bmatrix} = \begin{bmatrix} 7 \\ 2 \\ 3 \end{bmatrix}$$

which is the same as $$\begin{bmatrix} E0 \\ E1 \\ E2 \end{bmatrix} = \begin{bmatrix} 7 \\ 2 \\ 3 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 1 \\ 9 \\ 13 \\ 7 \\ 4 \\ 11 \\ 8 \\ 2 \\ 5 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 1 \\ 8 \\ 12 \\ 6 \\ 4 \\ 10 \\ 8 \\ 2 \\ 5 \end{bmatrix}.$$

The Fourteenth Example Approximation again conforms to the generalized flow structure shown in FIG. 6, and uses the following constants:

S=1

$$\begin{bmatrix} E0 \\ E1 \\ E2 \end{bmatrix} = \begin{bmatrix} 4 \\ 1 \\ 2 \end{bmatrix}$$

which is the same as $$\begin{bmatrix} E0 \\ E1 \\ E2 \end{bmatrix} = \begin{bmatrix} 4 \\ 1 \\ 2 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 0 \\ 4 \\ 6 \\ 2 \\ 1 \\ 5 \\ 4 \\ 0 \\ 2 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 1 \\ 4 \\ 6 \\ 3 \\ 2 \\ 5 \\ 4 \\ 1 \\ 2 \end{bmatrix}.$$

The Fifteenth Example Approximation again conforms to the generalized flow structure shown in FIG. 6, and uses the following constants:

S=0

$$\begin{bmatrix} E0 \\ E1 \\ E2 \end{bmatrix} = \begin{bmatrix} 2 \\ 1 \\ 0 \end{bmatrix}$$

which produces better results than $$\begin{bmatrix} E0 \\ E1 \\ E2 \end{bmatrix} = \begin{bmatrix} 2 \\ 1 \\ 1 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 1 \\ 1 \\ 3 \\ 1 \\ 1 \\ 2 \\ 2 \\ 0 \\ 1 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 0 \\ 2 \\ 3 \\ 2 \\ 1 \\ 3 \\ 2 \\ 0 \\ 1 \end{bmatrix}.$$

The same approach applied on larger and larger values of S become more accurate. The cost for achieving higher accuracy is that the longer bit-length registers are needed for computation and storage. Additional examples are provided below, which may be useful in some applications that demand more precision.

The Sixteenth Example Approximation again conforms to the generalized flow structure shown in FIG. 6, and uses the following constants:

S=15

$$\begin{bmatrix} E0 \\ E1 \\ E2 \end{bmatrix} = \begin{bmatrix} 60547 \\ 17734 \\ 25079 \end{bmatrix}$$

which produces better results than $$\begin{bmatrix} E0 \\ E1 \\ E2 \end{bmatrix} = \begin{bmatrix} 60547 \\ 17734 \\ 25080 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 9785 \\ 67277 \\ 100687 \\ 49195 \\ 29490 \\ 83982 \\ 64277 \\ 12785 \\ 38531 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 9786 \\ 67277 \\ 100687 \\ 49195 \\ 29490 \\ 83982 \\ 64277 \\ 12785 \\ 38531 \end{bmatrix}.$$

The Seventeenth Example Approximation again conforms to the generalized flow structure shown in FIG. 6, and uses the following constants:

S=16

$$\begin{bmatrix} E0 \\ E1 \\ E2 \end{bmatrix} = \begin{bmatrix} 121095 \\ 35468 \\ 50159 \end{bmatrix}$$

which is the same as $$\begin{bmatrix} E0 \\ E1 \\ E2 \end{bmatrix} = \begin{bmatrix} 121095 \\ 35468 \\ 50159 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 19571 \\ 134553 \\ 201373 \\ 98391 \\ 58981 \\ 167963 \\ 128553 \\ 25571 \\ 77062 \end{bmatrix}$$

which is the same as $$\begin{bmatrix} D0 \\ D1 \\ D2 \\ D3 \\ D4 \\ D5 \\ D6 \\ D7 \\ D8 \end{bmatrix} = \begin{bmatrix} 19571 \\ 134553 \\ 201373 \\ 98391 \\ 58981 \\ 167963 \\ 128553 \\ 25571 \\ 77062 \end{bmatrix}.$$

The Eighteenth Example Approximation again conforms to the generalized flow structure shown in FIG. 6, and uses the following constants:

S=17

$$\begin{bmatrix} E0 \\ E1 \\ E2 \end{bmatrix} = \begin{bmatrix} 242190 \\ 70936 \\ 100318 \end{bmatrix}$$

which produces better results than $$\begin{bmatrix} E0 \\ E1 \\ E2 \end{bmatrix} = \begin{bmatrix} 242189 \\ 70936 \\ 100318 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 39142 \\ 269106 \\ 402746 \\ 196780 \\ 117961 \\ 335926 \\ 257107 \\ 51141 \\ 154124 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 39142 \\ 269107 \\ 402746 \\ 196781 \\ 117962 \\ 335926 \\ 257107 \\ 51142 \\ 154124 \end{bmatrix}.$$

The Nineteenth Example Approximation again conforms to the generalized flow structure shown in FIG. 6, and uses the following constants:

S=18

$$\begin{bmatrix} E0 \\ E1 \\ E2 \end{bmatrix} = \begin{bmatrix} 484379 \\ 141871 \\ 200637 \end{bmatrix}$$

which produces better results than $$\begin{bmatrix} E0 \\ E1 \\ E2 \end{bmatrix} = \begin{bmatrix} 484379 \\ 141871 \\ 200636 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 78285 \\ 538213 \\ 805493 \\ 393563 \\ 235924 \\ 671853 \\ 514214 \\ 102284 \\ 308249 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 78284 \\ 538213 \\ 805493 \\ 393562 \\ 235923 \\ 671853 \\ 514214 \\ 102284 \\ 308249 \end{bmatrix}.$$

The Twentieth Example Approximation again conforms to the generalized flow structure shown in FIG. 6, and uses the following constants:

S=19

$$\begin{bmatrix} E0 \\ E1 \\ E2 \end{bmatrix} = \begin{bmatrix} 968758 \\ 283743 \\ 401272 \end{bmatrix}$$

which produces better results than $$\begin{bmatrix} E0 \\ E1 \\ E2 \end{bmatrix} = \begin{bmatrix} 968758 \\ 283743 \\ 401273 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 156568 \\ 1076426 \\ 1610984 \\ 787124 \\ 471846 \\ 1343705 \\ 1028427 \\ 204567 \\ 616497 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 156569 \\ 1076426 \\ 1610986 \\ 787125 \\ 471847 \\ 1343706 \\ 1028428 \\ 204567 \\ 616497 \end{bmatrix}.$$

The Twenty-first Example Approximation again conforms to the generalized flow structure shown in FIG. 6, and uses the following constants:

$S=20$ $$\begin{bmatrix} E0 \\ E1 \\ E2 \end{bmatrix} = \begin{bmatrix} 1937516 \\ 567485 \\ 802546 \end{bmatrix}$$

which produces better results than $$\begin{bmatrix} E0 \\ E1 \\ E2 \end{bmatrix} = \begin{bmatrix} 1937516 \\ 567485 \\ 802545 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 313138 \\ 2152852 \\ 3221972 \\ 1574250 \\ 943694 \\ 2687412 \\ 2056856 \\ 409134 \\ 1232995 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 313138 \\ 2152852 \\ 3221971 \\ 1574249 \\ 943693 \\ 2687412 \\ 2056856 \\ 409134 \\ 1232995 \end{bmatrix}.$$

The Twenty-second Example Approximation again conforms to the generalized flow structure shown in FIG. 6, and uses the following constants:

$S=21$ $$\begin{bmatrix} E0 \\ E1 \\ E2 \end{bmatrix} = \begin{bmatrix} 3875031 \\ 1134970 \\ 1605091 \end{bmatrix}$$

which produces better results than $$\begin{bmatrix} E0 \\ E1 \\ E2 \end{bmatrix} = \begin{bmatrix} 3875032 \\ 1134970 \\ 1605091 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 626276 \\ 4305704 \\ 6443942 \\ 3148498 \\ 1887387 \\ 5374823 \\ 4113712 \\ 818268 \\ 2465990 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 626275 \\ 4305704 \\ 6443942 \\ 3148499 \\ 1887387 \\ 5374823 \\ 4113712 \\ 818268 \\ 2465990 \end{bmatrix}.$$

The Twenty-third Example Approximation again conforms to the generalized flow structure shown in FIG. 6, and uses the following constants:

S=22

$$\begin{bmatrix} E0 \\ E1 \\ E2 \end{bmatrix} = \begin{bmatrix} 7750063 \\ 2269941 \\ 3210181 \end{bmatrix}$$

which is the same as $$\begin{bmatrix} E0 \\ E1 \\ E2 \end{bmatrix} = \begin{bmatrix} 7750063 \\ 2269941 \\ 3210181 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 1252551 \\ 8611409 \\ 12887885 \\ 6296997 \\ 3774774 \\ 10749647 \\ 8227424 \\ 1636536 \\ 4931980 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 1252551 \\ 8611409 \\ 12887884 \\ 6296997 \\ 3774774 \\ 10749647 \\ 8227423 \\ 1636536 \\ 4931980 \end{bmatrix}.$$

The Twenty-fourth Example Approximation again conforms to the generalized flow structure shown in FIG. 6, and uses the following constants:

S=23

$$\begin{bmatrix} E0 \\ E1 \\ E2 \end{bmatrix} = \begin{bmatrix} 15500127 \\ 4539882 \\ 6420363 \end{bmatrix}$$

which produces better results than $$\begin{bmatrix} E0 \\ E1 \\ E2 \end{bmatrix} = \begin{bmatrix} 15500126 \\ 4539882 \\ 6420363 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2505100 \\ 17222818 \\ 25775768 \\ 12593994 \\ 7549547 \\ 21499293 \\ 16454846 \\ 3273072 \\ 9863959 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 2505101 \\ 17222818 \\ 25775768 \\ 12593994 \\ 7549548 \\ 21499293 \\ 16454846 \\ 3273072 \\ 9863959 \end{bmatrix}.$$

The Twenty-fifth Example Approximation again conforms to the generalized flow structure shown in FIG. 6, and uses the following constants:

S=24

$$\begin{bmatrix} E0 \\ E1 \\ E2 \end{bmatrix} = \begin{bmatrix} 31000253 \\ 9079764 \\ 12840725 \end{bmatrix}$$

which is the same as $$\begin{bmatrix} E0 \\ E1 \\ E2 \end{bmatrix} = \begin{bmatrix} 31000253 \\ 9079764 \\ 12840725 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 5010203 \\ 34445635 \\ 51551537 \\ 25187989 \\ 15099096 \\ 42998586 \\ 32909693 \\ 6546145 \\ 19727919 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 5010202 \\ 34445636 \\ 51551537 \\ 25187989 \\ 15099095 \\ 42998586 \\ 32909693 \\ 6546145 \\ 19727919 \end{bmatrix}.$$

The Twenty-sixth Example Approximation again conforms to the generalized flow structure shown in FIG. 6, and uses the following constants:

S=25

$$\begin{bmatrix} E0 \\ E1 \\ E2 \end{bmatrix} = \begin{bmatrix} 62000506 \\ 18159528 \\ 25681450 \end{bmatrix}$$

which is the same as $$\begin{bmatrix} E0 \\ E1 \\ E2 \end{bmatrix} = \begin{bmatrix} 62000506 \\ 18159528 \\ 25681450 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 10020405 \\ 68891271 \\ 103103073 \\ 50375977 \\ 30198191 \\ 85997172 \\ 65819386 \\ 13092290 \\ 39455838 \end{bmatrix}$$

which is the same as $$\begin{bmatrix} D0 \\ D1 \\ D2 \\ D3 \\ D4 \\ D5 \\ D6 \\ D7 \\ D8 \end{bmatrix} = \begin{bmatrix} 10020405 \\ 68891271 \\ 103103073 \\ 50375977 \\ 30198191 \\ 85997172 \\ 65819386 \\ 13092290 \\ 39455838 \end{bmatrix}.$$

The Twenty-seventh Example Approximation again conforms to the generalized flow structure shown in FIG. 6, and uses the following constants:

S=26

$$\begin{bmatrix} E0 \\ E1 \\ E2 \end{bmatrix} = \begin{bmatrix} 124001011 \\ 36319055 \\ 51362901 \end{bmatrix}.$$

which produces better results than $$\begin{bmatrix} E0 \\ E1 \\ E2 \end{bmatrix} = \begin{bmatrix} 124001012 \\ 36319055 \\ 51362901 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 20040810 \\ 137782542 \\ 206206146 \\ 100751954 \\ 60396382 \\ 171994344 \\ 131638772 \\ 26184580 \\ 78911676 \end{bmatrix}$$

which is the same as $$\begin{bmatrix} D0 \\ D1 \\ D2 \\ D3 \\ D4 \\ D5 \\ D6 \\ D7 \\ D8 \end{bmatrix} = \begin{bmatrix} 20040810 \\ 137782542 \\ 206206146 \\ 100751954 \\ 60396382 \\ 171994344 \\ 131638772 \\ 26184580 \\ 78911676 \end{bmatrix}.$$

The Twenty-eighth Example Approximation again conforms to the generalized flow structure shown in FIG. 6, and uses the following constants:

S=27

$$\begin{bmatrix} E0 \\ E1 \\ E2 \end{bmatrix} = \begin{bmatrix} 248002024 \\ 72638111 \\ 102725802 \end{bmatrix}$$

which is the same as $$\begin{bmatrix} E0 \\ E1 \\ E2 \end{bmatrix} = \begin{bmatrix} 248002024 \\ 72638111 \\ 102725802 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 40081619 \\ 275565085 \\ 412412293 \\ 201503909 \\ 120792764 \\ 343988689 \\ 263277544 \\ 52369160 \\ 157823352 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 40081619 \\ 275565084 \\ 412412293 \\ 201503908 \\ 120792764 \\ 343988688 \\ 263277544 \\ 52369160 \\ 157823352 \end{bmatrix}.$$

The Twenty-ninth Example Approximation again conforms to the generalized flow structure shown in FIG. 6, and uses the following constants:

$S=28$ $$\begin{bmatrix} E0 \\ E1 \\ E2 \end{bmatrix} = \begin{bmatrix} 496004047 \\ 145276222 \\ 205451603 \end{bmatrix}$$

which is the same as $$\begin{bmatrix} E0 \\ E1 \\ E2 \end{bmatrix} = \begin{bmatrix} 496004047 \\ 145276222 \\ 205451603 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 80163239 \\ 551130169 \\ 824824585 \\ 403007817 \\ 241585528 \\ 687977377 \\ 526555088 \\ 104738320 \\ 315646704 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 80163239 \\ 551130168 \\ 824824586 \\ 403007817 \\ 241585528 \\ 687977377 \\ 526555088 \\ 104738319 \\ 315646704 \end{bmatrix}.$$

The Thirtieth Example Approximation again conforms to the generalized flow structure shown in FIG. 6, and uses the following constants:

$S=29$ $$\begin{bmatrix} E0 \\ E1 \\ E2 \end{bmatrix} = \begin{bmatrix} 992008095 \\ 290552444 \\ 410903207 \end{bmatrix}$$

which produces better results than $$\begin{bmatrix} E0 \\ E1 \\ E2 \end{bmatrix} = \begin{bmatrix} 992008094 \\ 290552444 \\ 410903207 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 160326478 \\ 1102260336 \\ 1649649172 \\ 806015634 \\ 483171056 \\ 1375954754 \\ 1053110176 \\ 209476638 \\ 631293407 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 160326478 \\ 1102260336 \\ 1649649171 \\ 806015634 \\ 483171056 \\ 1375954754 \\ 1053110176 \\ 209476638 \\ 631293407 \end{bmatrix}.$$

The Thirty-first Example Approximation again conforms to the generalized flow structure shown in FIG. 6, and uses the following constants:

$S=30$ $$\begin{bmatrix} E0 \\ E1 \\ E2 \end{bmatrix} = \begin{bmatrix} 1984016189 \\ 581104888 \\ 821806413 \end{bmatrix}$$

which is the same as $$\begin{bmatrix} E0 \\ E1 \\ E2 \end{bmatrix} = \begin{bmatrix} 1984016189 \\ 581104888 \\ 821806413 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 320652956 \\ 2204520672 \\ 3299298342 \\ 1612031266 \\ 966342111 \\ 2751909507 \\ 2106220352 \\ 418953276 \\ 1262586814 \end{bmatrix}$$

which produces better results than $$\begin{bmatrix} D0 \\ D1 \\ D2 \\ D3 \\ D4 \\ D5 \\ D6 \\ D7 \\ D8 \end{bmatrix} = \begin{bmatrix} 320652956 \\ 2204520673 \\ 3299298343 \\ 1612031267 \\ 966342111 \\ 2751909508 \\ 2106220352 \\ 418953276 \\ 1262586814 \end{bmatrix}.$$

Figure 7:
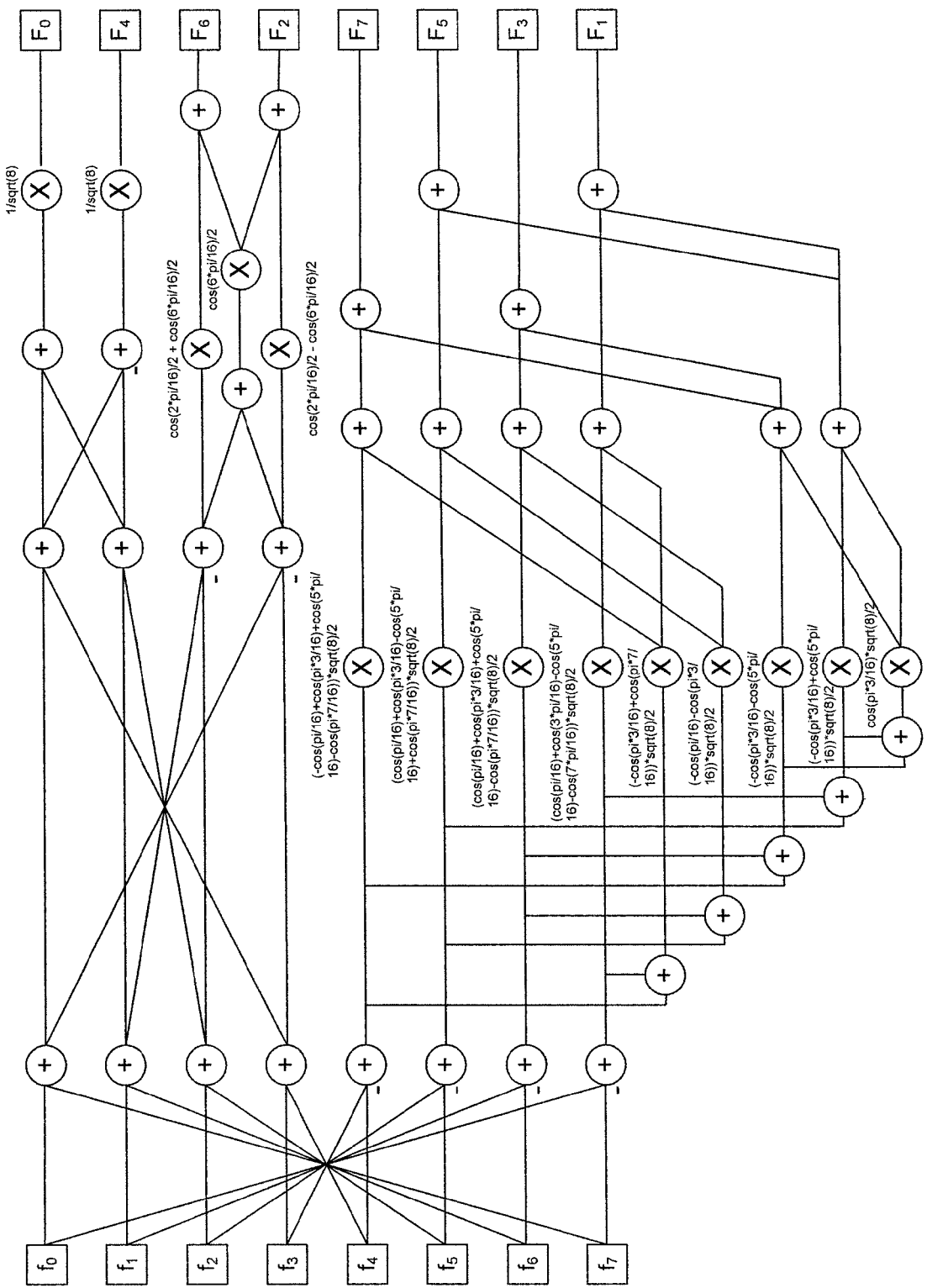
FIG. 7 is a signal flow diagram of an LLM decomposition of a one-dimensional 8-input forward DCT, as is known in the prior art.

The above discussion has focused on the computation of an inverse DCT. A forward DCT can be computed using the same concepts. Those well versed in the art will appreciate that when a DCT is expressed in orthonormal (unitary) form, a forward DCT conversion matrix is simply the transpose of an inverse DCT conversion matrix, so a decomposition that can be used to compute a forward DCT can also be used to compute an inverse DCT and vice versa. An LLM decomposition of a forward DCT can thus be constructed according to the same principles described above. An ideal length-8 forward DCT that uses the LLM decomposition is shown in FIG. 7.

Figure 8:
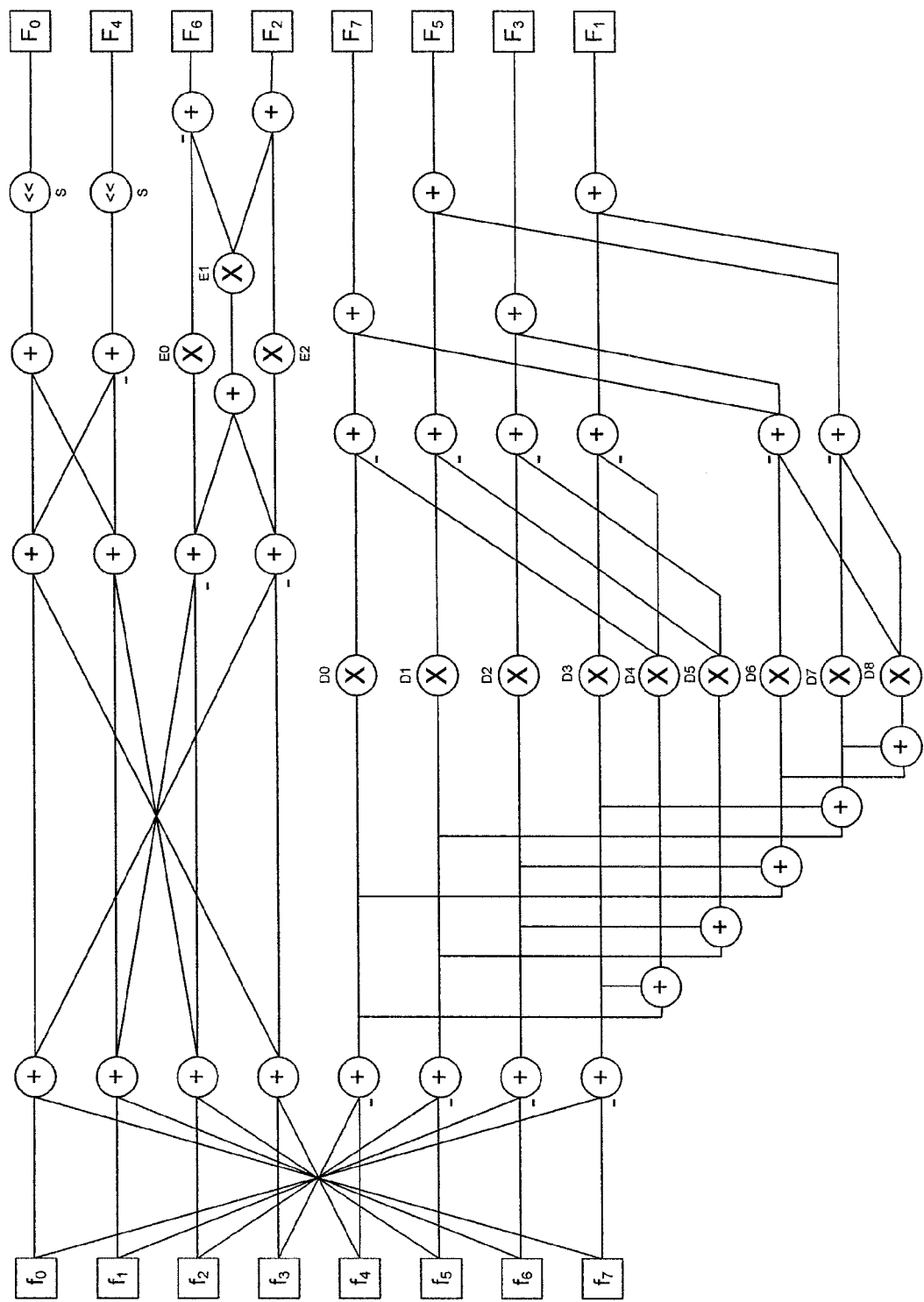
FIG. 8 is a signal flow diagram of a generalized fixed point approximation of the LLM decomposition of a one-dimensional 8-input forward DCT.

The approach considering cascaded effects previously described above can be applied to design a fixed-point approximation of the forward DCT. As a particular example, FIG. 8 depicts a generalized form of the forward DCT. Following the approach taken for the computation of an inverse DCT, the same values of S, E0 through E2, and D0 through D8 of the foregoing inverse DCT examples (First through Thirty-first Example Approximations) can be applied in the design of a forward DCT.

As previously mentioned, a two-dimensional (rectangular or square) DCT or inverse DCT can be constructed by first performing a DCT/inverse DCT in one dimension and then a DCT/inverse DCT in the other dimension. For example, first performing a DCT/inverse DCT on the rows of an input data block and then on the columns of the outputs after the first DCT/inverse DCT.

An example of the application of the above described example approximations (forward and inverse DCT) to the topic of video coding is now described.

In video coding, each sample (sometimes called a pixel) is typically represented using 8 or 10 bits of data. The most common applications use 8 bits, so we will use this as our example. The value of the video data is typically first predicted, and then the difference from the prediction is encoded in an approximate fashion using a DCT and quantization. The prediction error (a difference of two 8 bit quantities) typically has a possible range of 9 bits during encoding. Quantization error or other phenomena may make it desirable to allow for an even larger range of differences during decoding (e.g., 10 bits).

Thus, a good design for an 8×8 forward DCT for encoding may be constructed as follows:

Acquire input data with a 9 bit input dynamic range

Perform a length-8 fixed-point forward DCT along columns of input data as described above with S=13 (e.g., the First Example Approximation, so that the multiplication factors can fit into 16 bit signed or unsigned integers), which expands the dynamic range to 9+1.5+1.5+13=25 bits (where 9 is the dynamic range of the input data, the first added 1.5 accounts for the expansion of dynamic range due to an ideal length-8 forward DCT, the second added 1.5 accounts for the overall amplification by sqrt(8), and the final added 13 accounts for the use of S=13 in the fixed-point arithmetic processing.

Shift the result to the right (with rounding) by R=12 bits to reduce its dynamic range to 13 bits. Note that this allows the column-transformed intermediate results to be stored in 16-bit integers (a storage size that is commonly used in computer technology) and allows the results of the sums and differences at the beginning of the second stage to be computed with 16-bit results as well.

Perform a length-8 fixed-point forward DCT along rows of intermediate results as described above with S=13 (First Example Approximation), which expands the dynamic range to 13+1.5+1.5+13=29 bits.

The resulting integer values can be interpreted as fixed-point representations with the binary point 17 places up from the LSB (1 bit of which come from S−R=13−12 in the first stage, 3 bits of which come from the overall amplification by sqrt(8) in each stage, and the remaining 13 bits of which come from the use of S=13 in the second stage).

If desired, the result can be converted to an integer by shifting to the right (with rounding) by R=17 bits.

In the operations where a result is to be shifted to the right (i.e., scaled down by a power of two), accuracy is typically best preserved by application of rounding when performing this operation. For example, the operation of shifting to the right (with rounding) can be performed as described in C notation as:

$$y=(x+(1<<(R-1)))>>R$$

where x is the integer input value, R is the amount of right-shifting to be performed (which would ordinarily be equal to 1 or larger when this type of rounding is applied), and y is the resulting right-shifted value. For purposes of this equation, it is assumed that x and y are represented using two's complement arithmetic and that when a number is shifted to the right, the bits shifted into the most-significant bits of the result are duplicates of the previous most significant bit, which is known as the sign bit (i.e., right shifts are assumed to be "arithmetic" right shifts as opposed to "logical" right shifts).

Those well-versed in the art will appreciate that such a design can be adjusted using S and R in each stage to customize it for several factors such as the following:

The dynamic range of the input data

The storage word-length used for the multiplication factors

The processing word-length supported for computation of results of multiplications, sums and differences, The storage word-length supported for holding the data between the horizontal and vertical stages of the two-dimensional transformation The storage and processing word-length supported for representation of the final results.

We now describe a similar design approach for an 8×8 inverse DCT for decoding. In a typical video coding design, the forward DCT process is followed by a quantization process. Later, during decoding, the decoder performs an approximate inversion of the quantization process. However, quantization is an inherently non-invertible process, so the inversion will not (in general) perfectly reproduce the output of the forward transformation. This approximation effect may increase the dynamic range of the output of the inverse DCT process. This increased dynamic range can, perhaps, in some cases be dealt with by using computer processing elements designed for clipping of output values that exceed the supported dynamic range. It can also be dealt with by scaling down the inverse transformation to support an increased effective dynamic range (e.g., more than 9 bits). Support of an increased effective dynamic range is required, in particular, for conformance to the IEEE 1180 accuracy specification or the MPEG-2 or MPEG-4 video coding specifications. We thus now choose to design the inverse DCT with one bit of extra dynamic range as follows:

Acquire transform coefficients with a nominal 12-bit dynamic range, but supporting an additional bit of dynamic range as described above.

Perform a length-8 fixed-point inverse DCT along rows of input transform coefficients as described above with S=13 (e.g., the First Example Approximation, so that multiplication factors can fit into 16 bit signed or unsigned integers), which alters the dynamic range to 12+1−1.5+1.5+13=26 bits, where 12+1 is the supported input dynamic range, the inverse transform nominally reduces dynamic range by 1.5 bits and the scale factor of sqrt(8) increases it by 1.5 bits, and the value of S increases it by 13 bits.

Shift the result to the right (with rounding) by R=12 bits to reduce its dynamic range to 14 bits. Note that this allows the row-transformed intermediate results to be stored in 16-bit integers (a storage size that is commonly used in computer technology) and allows the results of the sums and differences at the beginning of the second stage to be computed with 16-bit results as well.

Perform a length-8 fixed-point inverse DCT along columns of intermediate results as described above with S=13 (First Example Approximation), which expands the dynamic range to 14−1.5+1.5+13=27 bits.

The resulting integer values can be interpreted as fixed-point representations with the binary point 17 places up from the LSB (1 bit of which comes from S−R=13−12 in the first stage, 3 bits of which come from the overall amplification by sqrt(8) in each stage, and the remaining 13 bits of which come from the use of S=13 in the second stage).

If desired, the result can be converted to an integer by shifting to the right (with rounding) by R=17 bits. An additional 10 bits of dynamic range remain supported, allowing for the nominal 9 bits of ideal signal amplitude and one additional bit for quantization inversion approximation error.

An alternative variation of the above inverse DCT design is to perform a right shift of only R=11 bits rather than 12 bits after the first stage (and thus R=18 rather than 17 in the second stage). Although, referring to FIG. 6, in theory this might result in an overflow of a 16 bit input range for the input to the multiplier associated with the multiplication factor D8, experiments with the conformance test methodology specified in IEEE 1180 and the MPEG-2 and MPEG-4 video conformance specifications can show that such an overflow may be so unlikely to occur in the context of practical video coding applications that the improvement in accuracy for the vast majority of input data resulting from the use of a smaller value of R in the first stage may justify neglecting the hypothetical possibility of this rare overflow condition.

When performing such an inverse DCT approximation in which a right shift of R bits is to be performed after the first or second stage and for which a rounding offset is applied prior to the operation of the right shift (for example, the above-described rounding offset value of (1<<(R−1)), the effect of the rounding offset can be achieved in a simplified manner by adding an equivalent offset in an earlier part of the processing flow diagram. For example, referring to FIG. 6, the flow diagram can be modified by adding a rounding offset value to the output of the left shift operator that is applied to the input signal $F_0$, and the result will be the same as adding the rounding offset to every term $f_0$ through $f_7$ at the far right side of the signal flow diagram (thus using one addition instead of eight for the offset operations prior to the right shifting).

There could be more 8×8 (or other block sizes) forward or inverse DCT designs other than the foresaid one which used the First Example Approximation. With the other Example Approximations or with other modifications, different accuracy for the IDCT output compared with ideal floating point DCT or IDCT output could be achieved and different complexity might be needed for different designs.

3. Derivation of Integer Multiplication Factor Values

We now describe the method that we used to derive the integer multiplication factors in the above-described designs. Various other methods can be used alternatively or in combination with this method to solve the problem of finding the best integers (or, equivalently, fixed-point numbers) to fit the ideal complete matrix entry values.

The above described 12-multiplier LLM decomposition shown in FIGS. 6 (IDCT) and 8 (forward DCT) has particularly good properties for deriving ideal integer multiplication factors. This is due to the fact that the decomposition used in this case is structured using only trivial operations (such as sums and differences) rather than cascaded multiplications.

The length-8 forward DCT process can be expressed as $$\begin{bmatrix} F(0) \\ F(4) \\ F(6) \\ F(2) \\ F(7) \\ F(5) \\ F(3) \\ F(1) \end{bmatrix} = T_8 * \begin{bmatrix} f(0) \\ f(1) \\ f(2) \\ f(3) \\ f(4) \\ f(5) \\ f(6) \\ f(7) \end{bmatrix}$$

and the corresponding length-8 inverse DCT process can be expressed as $$\begin{bmatrix} f(0) \\ f(1) \\ f(2) \\ f(3) \\ f(4) \\ f(5) \\ f(6) \\ f(7) \end{bmatrix} = T_8^T * \begin{bmatrix} F(0) \\ F(4) \\ F(6) \\ F(2) \\ F(7) \\ F(5) \\ F(3) \\ F(1) \end{bmatrix}$$

The overall 8×8 forward transform matrix $T_8$ is decomposed as follows $$T_8 = \begin{bmatrix} T_{4E} & 0 \\ 0 & T_{4D} \end{bmatrix} \begin{bmatrix} I_4 & K_4 \\ K_4 & -I_4 \end{bmatrix}$$

where "0" denotes a matrix of appropriate dimension in which all entries are equal to zero, and $I_n$ with an integer subscript n denotes an identity matrix of size n×n, and $K_n$ with an integer subscript n denotes a matrix with only 1s on the skew main diagonal and 0s on all the other positions of size n×n, so that $$K_2 = \begin{bmatrix} 0 & 1 \\ 1 & 0 \end{bmatrix} \text{ and } K_4 = \begin{bmatrix} 0 & 0 & 0 & 1 \\ 0 & 0 & 1 & 0 \\ 0 & 1 & 0 & 0 \\ 1 & 0 & 0 & 0 \end{bmatrix},$$

and $T_{4E}$ and $T_{4D}$ are 4×4 matrices for the "even" and "odd" parts of the transformation as further discussed below.

Then $$T_{4E} = \begin{bmatrix} T_{2E} & 0 \\ 0 & T_{2D} \end{bmatrix} \begin{bmatrix} I_2 & K_2 \\ K_2 & -I_2 \end{bmatrix}$$

where $$T_{2E} = \frac{1}{\sqrt{8}} \begin{bmatrix} 1 & 1 \\ 1 & -1 \end{bmatrix}$$

$$T_{2D} = \frac{1}{2} \begin{bmatrix} -C_2 & C_6 \\ C_6 & C_2 \end{bmatrix}$$

where $C_n$ with an integer subscript n denotes the following multiplication factor $$C_n = \cos(n*\pi/16)$$

The above multiplier of $1/\text{sqrt}(8)$ for $T_{2E}$ can be incorporated into an overall scale factor and, in a 2-D transformation, can be combined with the following stage to produce a 3-bit shift requiring no explicit multiplication factor approximation.

The matrix $T_{2D}$ has a well-known form known as a "butterfly", i.e., it has the form.

$$B = \begin{bmatrix} -a & b \\ b & a \end{bmatrix}$$

It is well known that a butterfly transformation matrix can be expressed as the sum of two matrices:

$$\begin{bmatrix} -a & b \\ b & a \end{bmatrix} = b \begin{bmatrix} 1 & 1 \\ 1 & 1 \end{bmatrix} + \begin{bmatrix} -(a+b) & 0 \\ 0 & a-b \end{bmatrix}$$

and the above form requires only three multiplications rather than four. This completes the complete derivation of the "even" part of the decomposition, i.e., of $T_{4E}$.

In the description below, the function notation, Round(x), should be interpreted to denote rounding to the integer that is the closest to the real-valued argument x (with some suitable rule for resolving the problem of values exactly halfway between integer values, such as rounding toward the nearest even number or rounding toward zero).

The conventional approach would then be to round each of the values of $\check{b}=\sqrt{8}*2^S*b$, $\check{c}=\sqrt{8}*2^S*(a-b)$, and $\check{d}=\sqrt{8}*2^S*(a+b)$ to the nearest integer, and then to apply these multiplication factors Round($\check{b}$), Round($\check{c}$), and Round($\check{d}$) in the even part of the flow diagram.

Our approach is to instead round the values of $\hat{a}=\sqrt{8}*2^S*a$ and $\hat{b}=\sqrt{8}*2^S*b$ to the nearest integer first, thus obtaining the best approximation of the effective complete matrix B, and then to derive the integer multiplication factors as Round($\hat{b}$), Round($\hat{a}$)−Round($\hat{b}$), and Round($\hat{a}$)+Round($\hat{b}$). This will produce a more accurate approximation of the overall resulting butterfly transformation matrix $\sqrt{8}*2^S*B$.

An alternative variation of the "even" part of the decomposition can be represented as:

$$\begin{bmatrix} a & b \\ b & -a \end{bmatrix} = \begin{bmatrix} a & a \\ -a & -a \end{bmatrix} + \begin{bmatrix} 0 & b-a \\ b+a & 0 \end{bmatrix}.$$

Notice that the absolute values of (a−b) and (b−a) are the same. So are the absolute values of (a+b) and −(a+b). Therefore, the basic structure of the transformation would remain the same, but the multiplication factors would be different (a and b) and the addition or subtraction process would be changed in this alternative decomposition.

Now the "odd" part of the transformation remains. The matrix $T_{4D}$ is given by:

$$T_{4D} = \frac{1}{2}\begin{bmatrix} -C_1 & C_3 & -C_5 & C_7 \\ C_3 & C_7 & -C_1 & C_5 \\ -C_5 & -C_1 & -C_7 & C_3 \\ C_7 & C_5 & C_3 & C_1 \end{bmatrix}$$

For this, the diagrammed LLM technique separates the above form into the sum of 6 component matrices as follows:

$$\begin{bmatrix} -C_1 & C_3 & -C_5 & C_7 \\ C_3 & C_7 & -C_1 & C_5 \\ -C_5 & -C_1 & -C_7 & C_3 \\ C_7 & C_5 & C_3 & C_1 \end{bmatrix} = C_3\begin{bmatrix} 1 & 1 & 1 & 1 \\ 1 & 1 & 1 & 1 \\ 1 & 1 & 1 & 1 \\ 1 & 1 & 1 & 1 \end{bmatrix} + (C_7 - C_3)\begin{bmatrix} 1 & 0 & 0 & 1 \\ 0 & 0 & 0 & 0 \\ 0 & 0 & 0 & 0 \\ 1 & 0 & 0 & 1 \end{bmatrix} -$$

$$(C_5 + C_3)\begin{bmatrix} 1 & 0 & 1 & 0 \\ 0 & 0 & 0 & 0 \\ 1 & 0 & 1 & 0 \\ 0 & 0 & 0 & 0 \end{bmatrix} + (C_5 - C_3)\begin{bmatrix} 0 & 0 & 0 & 0 \\ 0 & 1 & 0 & 1 \\ 0 & 0 & 0 & 0 \\ 0 & 1 & 0 & 1 \end{bmatrix} - (C_1 + C_3)\begin{bmatrix} 0 & 0 & 0 & 0 \\ 0 & 1 & 1 & 0 \\ 0 & 1 & 1 & 0 \\ 0 & 0 & 0 & 0 \end{bmatrix} +$$

$$\begin{bmatrix} -C_1 + C_3 + C_5 - C_7 & 0 & 0 & 0 \\ 0 & C_1 + C_3 - C_5 + C_7 & 0 & 0 \\ 0 & 0 & C_1 + C_3 + C_5 - C_7 & 0 \\ 0 & 0 & 0 & C_1 + C_3 - C_5 - C_7 \end{bmatrix}$$

To derive an improved approximation, rather than individually rounding the scaled elements of the six component matrices (e.g., using Round($\sqrt{8}*2^{S-1}*C_3$), Round($\sqrt{8}*2^{S-1}*(C_7-C_3)$), Round($\sqrt{8}*2^{S-1}*(C_5+C_3)$), Round($\sqrt{8}*2^{S-1}*(C_5-C_3)$), Round($\sqrt{8}*2^{S-1}*(C_1+C_3)$), Round($\sqrt{8}*2^{S-1}*(-C_1+C_3+C_5-C_7)$), Round($\sqrt{8}*2^{S-1}*(C_1+C_3-C_5+C_7)$), Round($\sqrt{8}*2^{S-1}*(C_1+C_3+C_5-C_7)$), and Round($\sqrt{8}*2^{S-1}*(C_1+C_3-C_5-C_7)$)) to compute the integer multiplication factors, we round the scaled elements of the complete $T_{4D}$ matrix, using Round($\sqrt{8}*2^{S-1}*C_1$), Round($\sqrt{8}*2^{S-1}*C_3$), Round($\sqrt{8}*2^{S-1}*C_5$), and Round($\sqrt{8}*2^{S-1}*C_7$), and then use simple algebra to compute the integer multiplication factors for the six component matrices using sums and differences of the integers obtained from the scaled and rounded $T_{4D}$ matrix. This method (as opposed to individually rounding the scaled ideal multiplication factors found in the six component matrices) guarantees that the overall transformation process will produce the best approximation of the scaled matrix $\sqrt{8}*2^S*T_{4D}$ in the mean-squared-error sense.

The overall 8×8 inverse transform matrix $T^T_8$ is decomposed as follows $$T_8^T = \begin{bmatrix} I_4^T & K_4^T \\ K_4^T & -I_4^T \end{bmatrix}\begin{bmatrix} T_{4E}^T & 0 \\ 0 & T_{4D}^T \end{bmatrix}$$

Then $$T_{4E}^T = \begin{bmatrix} I_2^T & K_2^T \\ K_2^T & -I_2^T \end{bmatrix}\begin{bmatrix} T_{2E}^T & 0 \\ 0 & T_{2D}^T \end{bmatrix}$$

Notice that $I_2^T=I_2$, $K_2^T=K_2$, $T_{2E}^T=T_{2E}$, $T_{2D}^T=T_{2D}$, $I_4^T=I_4$, $K_4^T=K_4$ and $T_{4D}^T=T_{4D}$ due to the symmetry across the main diagonal of each matrix, the above decomposition process for $T_8$ could be applied on $T^T_8$. This will give out the same multiplication factors.

Figure 2:
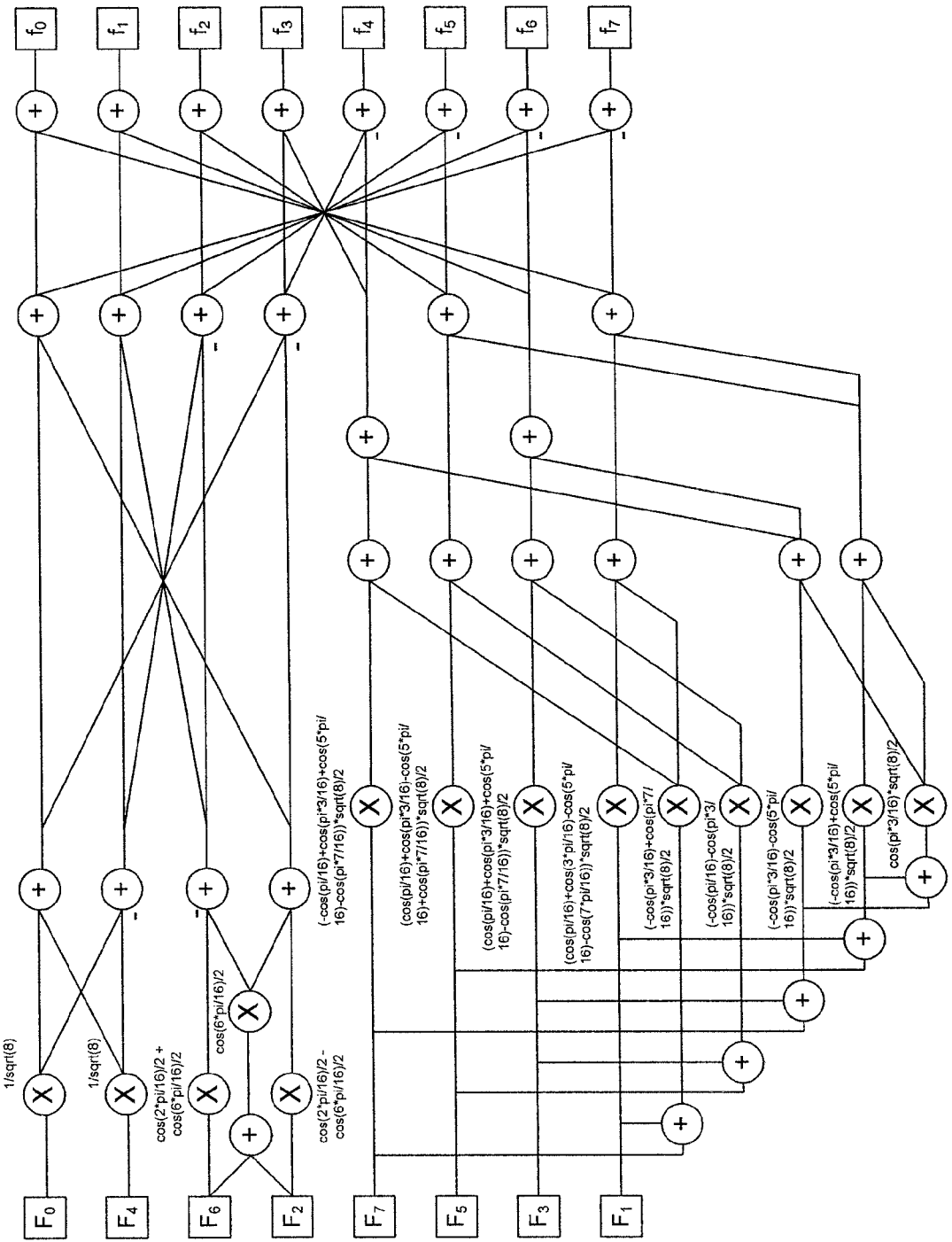
FIG. 2 is a signal flow diagram of an LLM decomposition of a one-dimensional 8-input inverse DCT, as is known in the prior art.

There could be two types of variations of the "odd" part as compared to the original decomposition structure shown in FIG. 2. These variations can give out the exact FDCT/IDCT output as long as the intermediate results during the decomposed structure don't overflow.

As we can see from the odd part in the butterfly structure, we need to find the common addend for the whole matrix first, like $C_3$ in the original decomposition process. Therefore, the first type of variation for the original LLM decomposition has the same common addend. We can use the following equation as an example.

$$\begin{bmatrix} C_7 & -C_5 & C_3 & -C_1 \\ C_5 & -C_1 & C_7 & C_3 \\ C_3 & -C_7 & -C_1 & -C_5 \\ C_1 & C_3 & C_5 & C_7 \end{bmatrix} = \begin{bmatrix} C_3 & C_3 & C_3 & C_3 \\ C_3 & C_3 & C_3 & C_3 \\ C_3 & C_3 & C_3 & C_3 \\ C_3 & C_3 & C_3 & C_3 \end{bmatrix} +$$

$$\begin{bmatrix} C_7 - C_3 & -C_5 - C_3 & 0 & -C_1 - C_3 \\ C_5 - C_3 & -C_1 - C_3 & C_7 - C_3 & 0 \\ 0 & -C_7 - C_3 & -C_1 - C_3 & -C_5 - C_3 \\ C_1 - C_3 & 0 & C_5 - C_3 & C_7 - C_3 \end{bmatrix}$$

Let us call the matrix $$\begin{bmatrix} C_7-C_3 & -C_5-C_3 & 0 & -C_1-C_3 \\ C_5-C_3 & -C_1-C_3 & C_7-C_3 & 0 \\ 0 & -C_7-C_3 & -C_1-C_3 & -C_5-C_3 \\ C_1-C_3 & 0 & C_5-C_3 & C_7-C_3 \end{bmatrix} T_{4Dtemp}$$

We need to find some other common addends in $T_{4Dtemp}$. We can see that there are three $C_7-C_3$, two $-C_5-C_3$, three $-C_1-C_3$, two $C_5-C_3$, one $-C_7-C_3$ and one $C_1-C_3$. There are no case that one coefficient is the negative of another, so we just need to consider coefficients with the same values. We could not use those coefficients as $-C_7-C_3$ and $C_1-C_3$, since they could not be used as common addend. Therefore, we can see that the last two rows in $T_{4Dtemp}$ just have two coefficients we could use for further decomposition, $-C_1-C_3$ and $-C_5-C_3$ for the $3^{rd}$ row, and $C_5-C_3$ and $C_7-C_3$ for the $4^{th}$ row. Since they have no common values, there could be no further decomposition between these two rows. Moreover, we could find that the $1^{st}$ row and the $3^{rd}$ row share the same coefficients $-C_5-C_3$, and the $2^{nd}$ row and the $4^{th}$ row share the same coefficients $C_5-C_3$, so two decomposition processes are fixed. The whole decomposition process is $$\begin{bmatrix} C_7 & -C_5 & C_3 & -C_1 \\ C_5 & -C_1 & C_7 & C_3 \\ C_3 & -C_7 & -C_1 & -C_5 \\ C_1 & C_3 & C_5 & C_7 \end{bmatrix} = \begin{bmatrix} C_3 & C_3 & C_3 & C_3 \\ C_3 & C_3 & C_3 & C_3 \\ C_3 & C_3 & C_3 & C_3 \\ C_3 & C_3 & C_3 & C_3 \end{bmatrix} +$$

$$\begin{bmatrix} C_7-C_3 & -C_5-C_3 & 0 & -C_1-C_3 \\ C_5-C_3 & -C_1-C_3 & C_7-C_3 & 0 \\ 0 & -C_7-C_3 & -C_1-C_3 & -C_5-C_3 \\ C_1-C_3 & 0 & C_5-C_3 & C_7-C_3 \end{bmatrix} = \begin{bmatrix} C_3 & C_3 & C_3 & C_3 \\ C_3 & C_3 & C_3 & C_3 \\ C_3 & C_3 & C_3 & C_3 \\ C_3 & C_3 & C_3 & C_3 \end{bmatrix} +$$

$$\begin{bmatrix} 0 & 0 & 0 & 0 \\ C_5-C_3 & 0 & C_5-C_3 & 0 \\ 0 & 0 & 0 & 0 \\ C_5-C_3 & 0 & C_5-C_3 & 0 \end{bmatrix} + \begin{bmatrix} 0 & -C_5-C_3 & 0 & -C_5-C_3 \\ 0 & 0 & 0 & 0 \\ 0 & -C_5-C_3 & 0 & -C_5-C_3 \\ 0 & 0 & 0 & 0 \end{bmatrix} +$$

$$\begin{bmatrix} C_7-C_3 & 0 & 0 & -C_1+C_5 \\ 0 & -C_1-C_3 & C_7-C_5 & 0 \\ 0 & -C_7+C_5 & -C_1-C_3 & 0 \\ C_1-C_5 & 0 & 0 & C_7-C_3 \end{bmatrix}$$

Right now, the intermediate result we get is the same as the original LLM decomposition.

$$\begin{bmatrix} C_7-C_3 & 0 & 0 & -C_1+C_5 \\ 0 & -C_1-C_3 & C_7-C_5 & 0 \\ 0 & -C_7+C_5 & -C_1-C_3 & 0 \\ C_1-C_5 & 0 & 0 & C_7-C_3 \end{bmatrix} =$$

$$\begin{bmatrix} 0 & 0 & 0 & 0 \\ 0 & -C_1-C_3 & C_7-C_5 & 0 \\ 0 & -C_7+C_5 & -C_1-C_3 & 0 \\ 0 & 0 & 0 & 0 \end{bmatrix} + \begin{bmatrix} C_7-C_3 & 0 & 0 & -C_1+C_5 \\ 0 & 0 & 0 & 0 \\ 0 & 0 & 0 & 0 \\ C_1-C_5 & 0 & 0 & C_7-C_3 \end{bmatrix}$$

The original LLM decomposition process just takes the remaining unchanged two coefficients $-C_1-C_3$ and $C_7-C_3$ which follows the same idea as the even part. However, we can discover that we could use the variation of the even part in this case. This won't change the multiplication factors, but will lead to a different structure with different addition and subtraction.

$$\begin{bmatrix} C_7 & -C_5 & C_3 & -C_1 \\ C_5 & -C_1 & C_7 & C_3 \\ C_3 & -C_7 & -C_1 & -C_5 \\ C_1 & C_3 & C_5 & C_7 \end{bmatrix} = \begin{bmatrix} -C_5 & -C_5 & -C_5 & -C_5 \\ C_5 & C_5 & C_5 & C_5 \\ -C_5 & -C_5 & -C_5 & -C_5 \\ C_5 & C_5 & C_5 & C_5 \end{bmatrix} + \begin{bmatrix} C_7+C_5 & 0 & C_3+C_5 & -C_1+C_5 \\ 0 & -C_1-C_5 & C_7-C_5 & C_3-C_5 \\ C_3+C_5 & -C_7+C_5 & -C_1+C_5 & 0 \\ C_1-C_5 & C_3-C_5 & 0 & C_7-C_5 \end{bmatrix}$$

$$\begin{bmatrix} C_7+C_5 & 0 & C_3+C_5 & -C_1+C_5 \\ 0 & -C_1-C_5 & C_7-C_5 & C_3-C_5 \\ C_3+C_5 & -C_7+C_5 & -C_1+C_5 & 0 \\ C_1-C_5 & C_3-C_5 & 0 & C_7-C_5 \end{bmatrix} =$$

$$\begin{bmatrix} C_3+C_5 & 0 & C_3+C_5 & 0 \\ 0 & 0 & 0 & 0 \\ C_3+C_5 & 0 & C_3+C_5 & 0 \\ 0 & 0 & 0 & 0 \end{bmatrix} + \begin{bmatrix} 0 & 0 & 0 & 0 \\ 0 & C_3-C_5 & 0 & C_3-C_5 \\ 0 & 0 & 0 & 0 \\ 0 & C_3-C_5 & 0 & C_3-C_5 \end{bmatrix} + \begin{bmatrix} C_7-C_3 & 0 & 0 & -C_1+C_5 \\ 0 & -C_1-C_3 & C_7-C_5 & 0 \\ 0 & -C_7+C_5 & -C_1-C_3 & 0 \\ C_1-C_5 & 0 & 0 & C_7-C_3 \end{bmatrix}$$

$$\left.\begin{bmatrix} C_7-C_3 & 0 & 0 & -C_1+C_5 \\ 0 & -C_1-C_3 & C_7-C_5 & 0 \\ 0 & -C_7+C_5 & -C_1-C_3 & 0 \\ C_1-C_5 & 0 & 0 & C_7-C_3 \end{bmatrix}\right\}$$ could have two decomposition method.

-continued $$\begin{bmatrix} C_7 & -C_5 & C_3 & -C_1 \\ C_5 & -C_1 & C_7 & C_3 \\ C_3 & -C_7 & -C_1 & -C_5 \\ C_1 & C_3 & C_5 & C_7 \end{bmatrix} = \begin{bmatrix} -C_5 & -C_5 & -C_5 & -C_5 \\ C_5 & C_5 & C_5 & C_5 \\ -C_5 & -C_5 & -C_5 & -C_5 \\ C_5 & C_5 & C_5 & C_5 \end{bmatrix} + \begin{bmatrix} C_3+C_5 & 0 & C_3+C_5 & 0 \\ 0 & 0 & 0 & 0 \\ C_3+C_5 & 0 & C_3+C_5 & 0 \\ 0 & 0 & 0 & 0 \end{bmatrix} +$$

$$\begin{bmatrix} 0 & 0 & 0 & 0 \\ 0 & C_3-C_5 & 0 & C_3-C_5 \\ 0 & 0 & 0 & 0 \\ 0 & C_3-C_5 & 0 & C_3-C_5 \end{bmatrix} + \begin{bmatrix} 0 & 0 & 0 & 0 \\ 0 & -C_1-C_3 & -C_1-C_3 & 0 \\ 0 & -C_1-C_3 & -C_1-C_3 & 0 \\ 0 & 0 & 0 & 0 \end{bmatrix} +$$

$$\begin{bmatrix} C_7-C_3 & 0 & 0 & C_7-C_3 \\ 0 & 0 & 0 & 0 \\ 0 & 0 & 0 & 0 \\ C_7-C_3 & 0 & 0 & C_7-C_3 \end{bmatrix} +$$

$$\begin{bmatrix} 0 & 0 & 0 & -C_1+C_5-C_7+C_3 \\ 0 & 0 & C_7-C_5+C_1+C_3 & 0 \\ 0 & -C_7+C_5+C_1+C_3 & 0 & 0 \\ C_1-C_5-C_7+C_3 & 0 & 0 & 0 \end{bmatrix}$$

There could be more LLM decomposition structures which share the same basic decomposition process with minor differences that come from the input and output data arrangement in the forward and/or inverse transform.

In both the "even" and "odd" parts of the LLM decomposition, we have shown above that this particular decomposition only requires constructing complete matrices from sums and differences of component matrices. No real "factoring" is required, as would be the case when using a decomposition that involves cascaded multiplication factors.

In a decomposition that used cascaded multiplication factors, it may be more difficult to determine the ideal integer multiplication factors for approximating a complete transformation matrix. However, a variety of techniques could be applied to solve this problem. One method of solution, for example, would be to initially choose multiplication factors using a conventional approach, and then to apply search techniques to try to improve upon that solution. For example, the "odd" part of the LLM decomposition uses 9 multipliers. An exhaustive search could be performed to test all combinations of $2*K+1$ possible values for each of these multipliers, where K is some small number such as 2 and the tested values consist of the conventional value of the multiplication factor plus or minus a number in the range from $-K$ to $+K$. For each combination, the squared distance between the resulting complete transformation matrix and the ideal complete transformation matrix could be computed.

There would be $(2*K+1)^9$ such combinations of values to test using this search technique. For example, for K=2, there would be 1,953,125 combinations to test. This would not be an impractical number when performing the search using modem computer technology.

A large variety of other techniques could be used for searching for a good solution that provides a benefit relative to the conventional approach.

4. Generalized Video Encoder and Decoder

An exemplary application of the above-described fixed-point approximation transforms is in multimedia signal processing systems, such as an audio, image or video encoder and decoder for the Microsoft Windows Media Video (WMV), Windows Media Audio (WMA), or other media formats. However, the transforms constructed as described herein are not limited to this application or format, and can be applied to other multimedia signal processing systems and media formats. Accordingly, the transforms are described in the context of a generalized image or video encoder and decoder, but alternatively can be incorporated in various types of multimedia signal processing systems.

Figure 9:
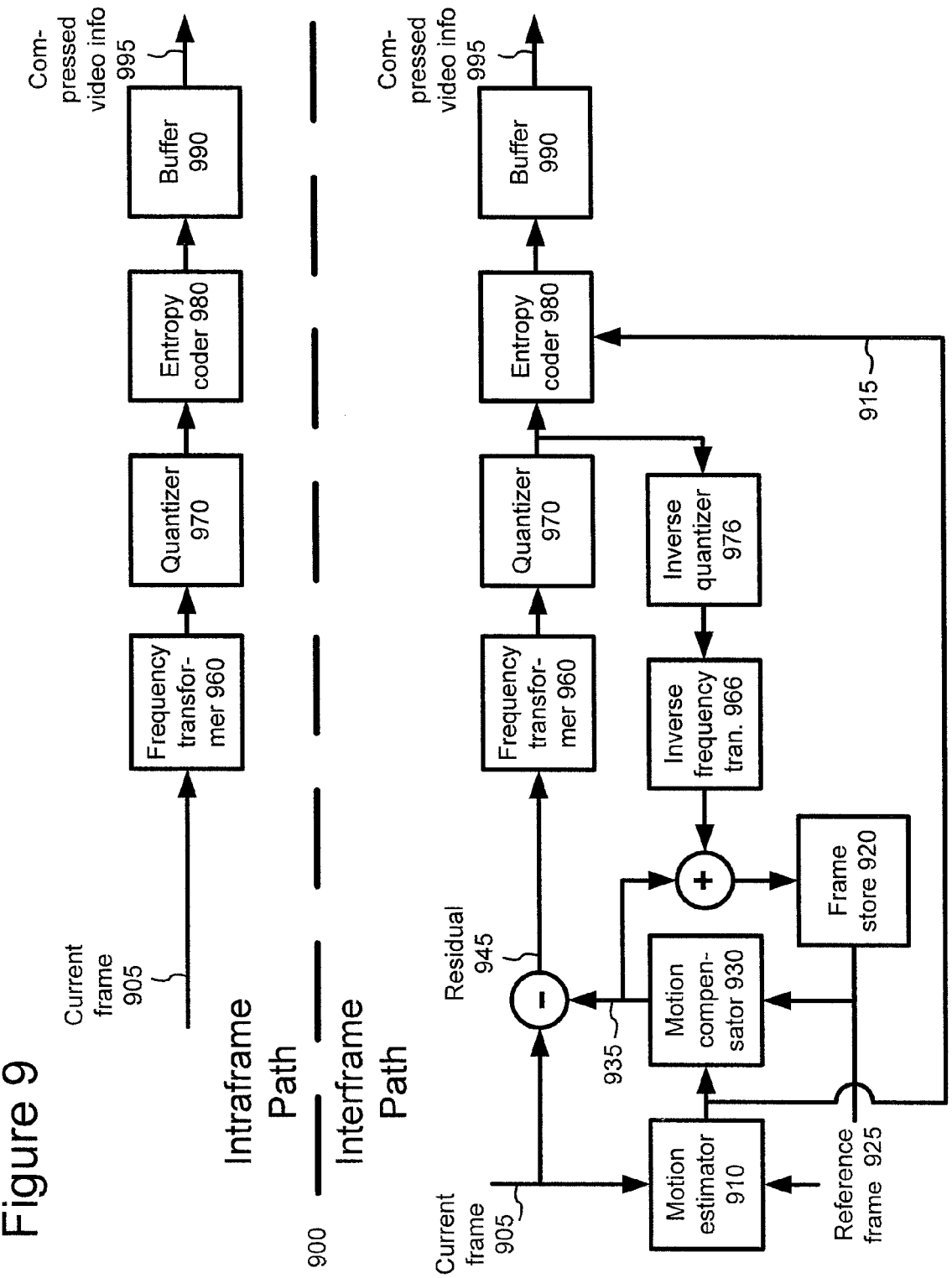
FIG. 9 is a block diagram of a multi-media signal processing system application (video encoder) utilizing a linear transformation approximation designed as described herein to have reduced computational complexity.
Figure 10:
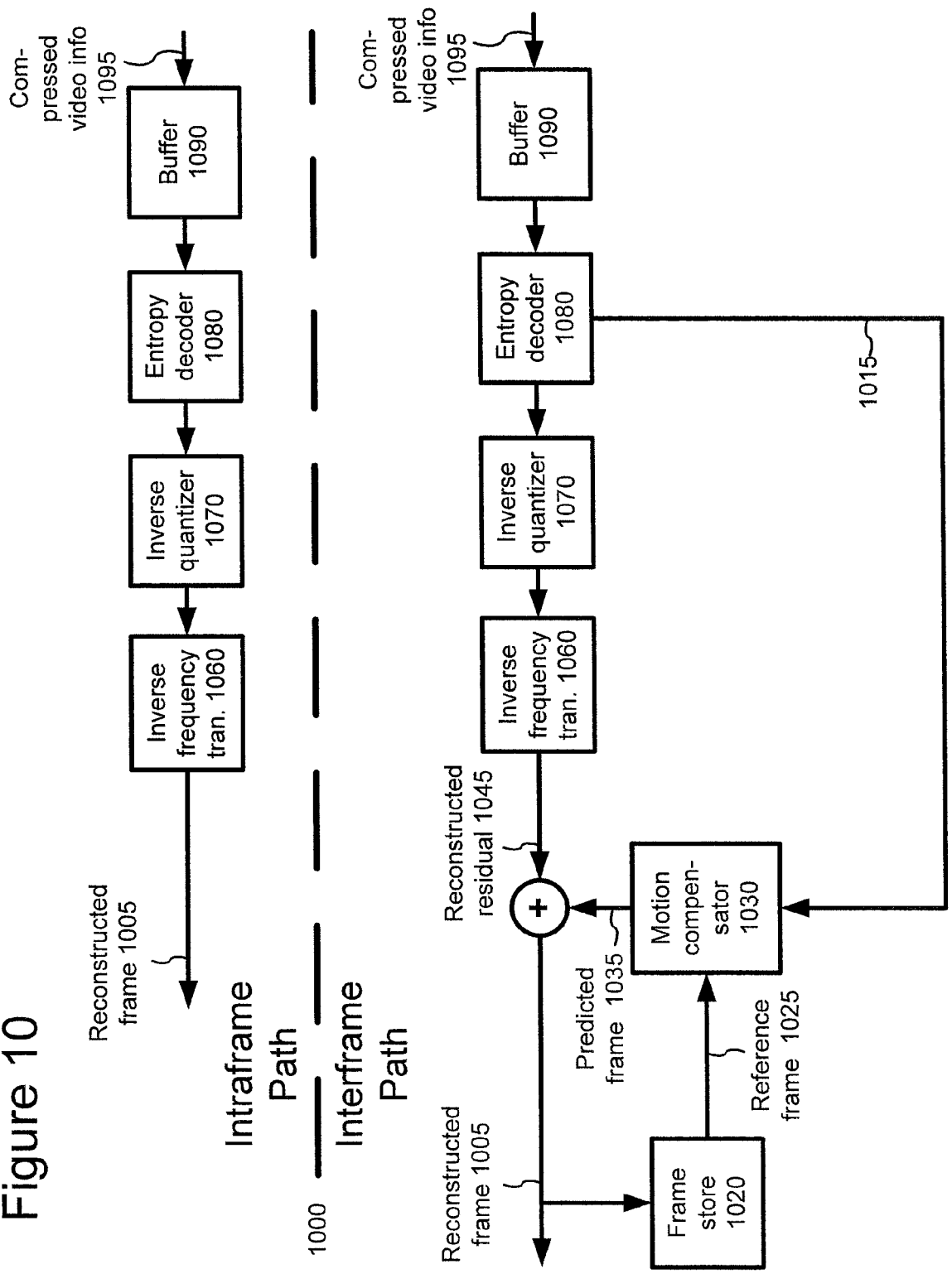
FIG. 10 is a block diagram of a multi-media signal processing system application (video decoder) utilizing a linear transformation approximation designed as described herein to have reduced computational complexity.

FIG. 9 is a block diagram of a generalized video encoder (900) and FIG. 10 is a block diagram of a generalized video decoder (1000).

The relationships shown between modules within the encoder and decoder indicate the main flow of information in the encoder and decoder; other relationships are not shown for the sake of simplicity. In particular, FIGS. 9 and 10 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video format or another format. The encoder (900) and decoder (1000) are block-based and use a 4:2:0 macroblock format with each macroblock including 4 luminance 8×8 luminance blocks (at times treated as one 16×16 macroblock) and two 8×8 chrominance blocks. Alternatively, the encoder (900) and decoder (1000) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 9 is a block diagram of a general video encoder system (900). The encoder system (900) receives a sequence of video frames including a current frame (905), and produces compressed video information (995) as output. Particular embodiments of video encoders typically use a variation or supplemented version of the generalized encoder (900).

Figure 1:
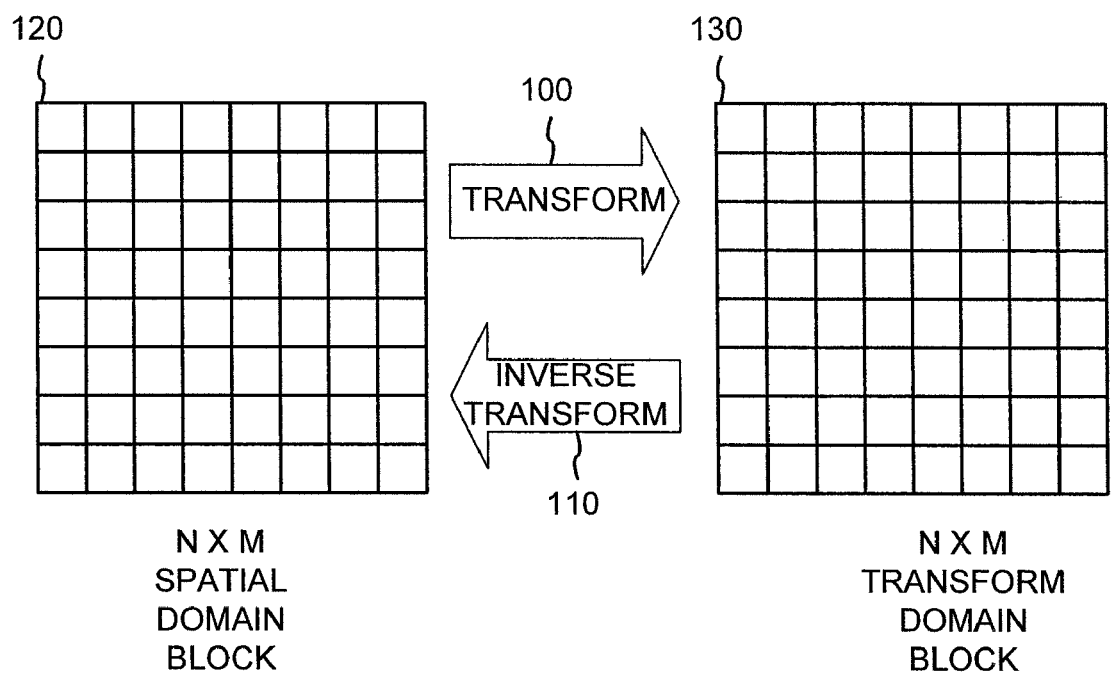
FIG. 1 is a block diagram illustrating a two-dimensional transformation, such as may be used in video coding.

The encoder system (900) compresses predicted frames and key frames. For the sake of presentation, FIG. 1 shows a path for key frames through the encoder system (900) and a path for forward-predicted frames. Many of the components of the encoder system (900) are used for compressing both key frames and predicted frames. The exact operations performed by those components can vary depending on the type of information being compressed.

A predicted frame [also called P-frame, B-frame for bidirectional prediction, or inter-coded frame] is represented in terms of prediction (or difference) from one or more other frames. A prediction residual is the difference between what was predicted and the original frame. In contrast, a key frame [also called I-frame, intra-coded frame] is compressed without reference to other frames.

If the current frame (905) is a forward-predicted frame, a motion estimator (910) estimates motion of macroblocks or other sets of pixels of the current frame (905) with respect to a reference frame, which is the reconstructed previous frame (925) buffered in the frame store (920). In alternative embodiments, the reference frame is a later frame or the current frame is bi-directionally predicted. The motion estimator (910) outputs as side information motion information (915), such as motion vectors. A motion compensator (930) applies the motion information (915) to the reconstructed previous frame (925) to form a motion-compensated current frame (935). The prediction is rarely perfect, however, and the difference between the motion-compensated current frame (935) and the original current frame (905) is the prediction residual (945). Alternatively, a motion estimator and motion compensator apply another type of motion estimation/compensation.

A frequency transformer (960) converts the spatial domain video information into frequency domain (i.e., spectral) data. For block-based video frames, the frequency transformer (960) applies a transform that has properties similar to the discrete cosine transform ["DCT"] (i.e., the Example Approximations described above). In some embodiments, the frequency transformer (960) applies the transform to blocks of spatial prediction residuals for key frames. The frequency transformer (960) can apply an 8×8, 8×4, 4×8, or other size transforms.

A quantizer (970) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder (900) can use frame dropping, adaptive filtering, or other techniques for rate control.

When a reconstructed current frame is needed for subsequent motion estimation/compensation, an inverse quantizer (976) performs inverse quantization on the quantized spectral data coefficients. An inverse frequency transformer (966) then performs the inverse of the operations of the frequency transformer (960), producing a reconstructed prediction residual (for a predicted frame) or a reconstructed key frame. If the current frame (905) was a key frame, the reconstructed key frame is taken as the reconstructed current frame (not shown). If the current frame (905) was a predicted frame, the reconstructed prediction residual is added to the motion-compensated current frame (935) to form the reconstructed current frame. The frame store (920) buffers the reconstructed current frame for use in predicting the next frame. In some embodiments, the encoder applies a deblocking filter to the reconstructed frame to adaptively smooth discontinuities in the blocks of the frame.

The entropy coder (980) compresses the output of the quantizer (970) as well as certain side information (e.g., motion information (915), quantization step size). Typical entropy coding techniques include arithmetic coding, differential coding, Huffman coding, run length coding, LZ coding, dictionary coding, and combinations of the above. The entropy coder (980) typically uses different coding techniques for different kinds of information (e.g., DC coefficients, AC coefficients, different kinds of side information), and can choose from among multiple code tables within a particular coding technique.

The entropy coder (980) puts compressed video information (995) in the buffer (990). A buffer level indicator is fed back to bit rate adaptive modules. The compressed video information (995) is depleted from the buffer (990) at a constant or relatively constant bit rate and stored for subsequent streaming at that bit rate. Alternatively, the encoder system (900) streams compressed video information immediately following compression.

Before or after the buffer (990), the compressed video information (995) can be channel coded for transmission over the network. The channel coding can apply error detection and correction data to the compressed video information (995).

B. Video Decoder

FIG. 10 is a block diagram of a general video decoder system (1000). The decoder system (1000) receives information (1095) for a compressed sequence of video frames and produces output including a reconstructed frame (1005). Particular embodiments of video decoders typically use a variation or supplemented version of the generalized decoder (1000).

The decoder system (1000) decompresses predicted frames and key frames. For the sake of presentation, FIG. 10 shows a path for key frames through the decoder system (1000) and a path for forward-predicted frames. Many of the components of the decoder system (1000) are used for compressing both key frames and predicted frames. The exact operations performed by those components can vary depending on the type of information being compressed.

A buffer (1090) receives the information (1095) for the compressed video sequence and makes the received information available to the entropy decoder (1080). The buffer (1090) typically receives the information at a rate that is fairly constant over time, and includes a jitter buffer to smooth short-term variations in bandwidth or transmission. The buffer (1090) can include a playback buffer and other buffers as well. Alternatively, the buffer (1090) receives information at a varying rate. Before or after the buffer (1090), the compressed video information can be channel decoded and processed for error detection and correction.

The entropy decoder (1080) entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (1080) frequently uses different decoding techniques for different kinds of information (e.g., DC coefficients, AC coefficients, different kinds of side information), and can choose from among multiple code tables within a particular decoding technique.

If the frame (1005) to be reconstructed is a forward-predicted frame, a motion compensator (1030) applies motion information (1015) to a reference frame (1025) to form a prediction (1035) of the frame (1005) being reconstructed.

For example, the motion compensator (1030) uses a macroblock motion vector to find a macroblock in the reference frame (1025). A frame buffer (1020) stores previous reconstructed frames for use as reference frames. Alternatively, a motion compensator applies another type of motion compensation. The prediction by the motion compensator is rarely perfect, so the decoder (1000) also reconstructs prediction residuals.

When the decoder needs a reconstructed frame for subsequent motion compensation, the frame store (1020) buffers the reconstructed frame for use in predicting the next frame. In some embodiments, the encoder applies a deblocking filter to the reconstructed frame to adaptively smooth discontinuities in the blocks of the frame.

An inverse quantizer (1070) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer (1060) converts the quantized, frequency domain data into spatial domain video information. For block-based video frames, the inverse frequency transformer (1060) applies an inverse transform described in the following sections. In some embodiments, the inverse frequency transformer (1060) applies an inverse frequency transform to blocks of spatial prediction residuals for key frames. The inverse frequency transformer (1060) can apply an 8×8, 8×4, 4×8, or other size inverse frequency transforms.

5. Computing Environment

The above described codec based on the fixed-point approximation transforms can be performed on any of a variety of devices in which digital media signal processing is performed, including among other examples, computers; image and video recording, transmission and receiving equipment; portable video players; video conferencing; and etc. The digital media coding techniques can be implemented in hardware circuitry, as well as in digital media processing software executing within a computer or other computing environment, such as shown in FIG. 11.

Figure 11:
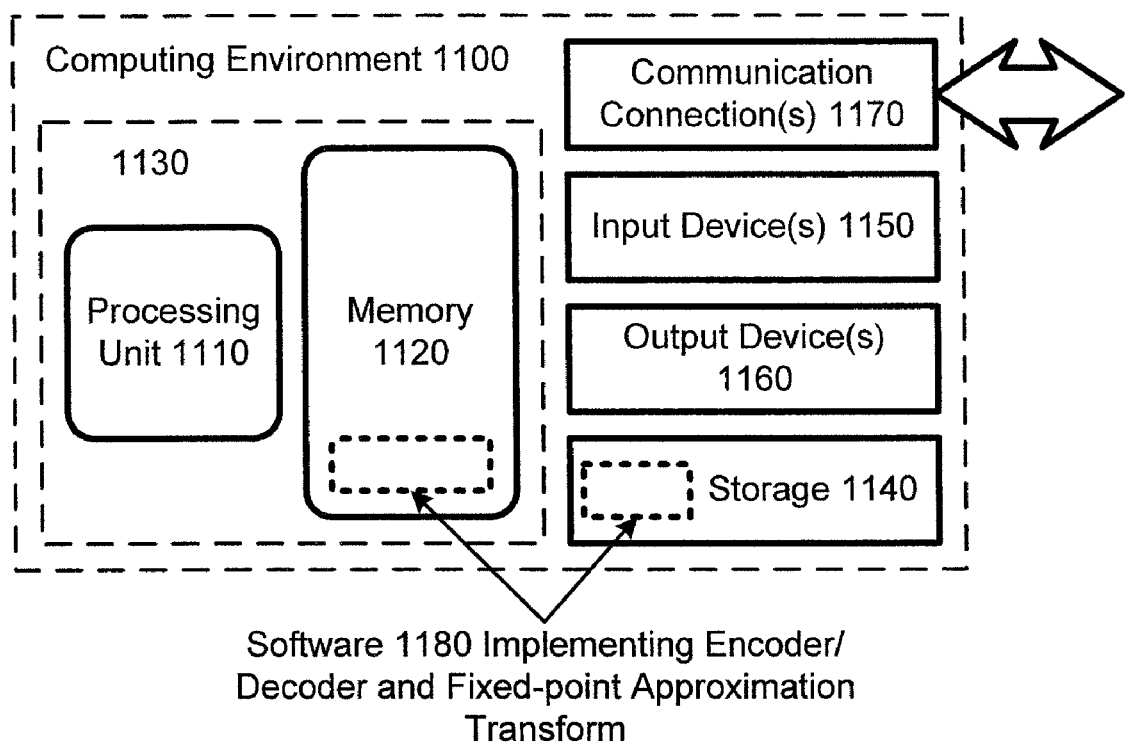
FIG. 11 is a block diagram of a suitable computing environment for implementing a multimedia signal processing system utilizing a linear transformation approximation designed as described herein to have reduced computational complexity, such as that of FIGS. 1 and 10.

FIG. 11 illustrates a generalized example of a suitable computing environment (1100) in which described embodiments may be implemented. The computing environment (1100) is not intended to suggest any limitation as to scope of use or functionality of the invention, as the present invention may be implemented in diverse general-purpose or special-purpose computing environments.

With reference to FIG. 11, the computing environment (1100) includes at least one processing unit (1110) and memory (1120). In FIG. 11, this most basic configuration (1130) is included within a dashed line. The processing unit (1110) executes computer-executable instructions and may be a real or a virtual processor. In a multi-processing system, multiple processing units execute computer-executable instructions to increase processing power. The memory (1120) may be volatile memory (e.g., registers, cache, RAM), non-volatile memory (e.g., ROM, EEPROM, flash memory, etc.), or some combination of the two. The memory (1120) stores software (1180) implementing the described encoder/decoder and transforms.

A computing environment may have additional features. For example, the computing environment (1100) includes storage (1140), one or more input devices (1150), one or more output devices (1160), and one or more communication connections (1170). An interconnection mechanism (not shown) such as a bus, controller, or network interconnects the components of the computing environment (1100). Typically, operating system software (not shown) provides an operating environment for other software executing in the computing environment (1100), and coordinates activities of the components of the computing environment (1100).

The storage (1140) may be removable or non-removable, and includes magnetic disks, magnetic tapes or cassettes, CD-ROMs, CD-RWs, DVDs, or any other medium which can be used to store information and which can be accessed within the computing environment (1100). The storage (1140) stores instructions for the software (1180) implementing the codec based on a lapped transform using the 4×4 pre/post-filtering.

The input device(s) (1150) may be a touch input device such as a keyboard, mouse, pen, or trackball, a voice input device, a scanning device, or another device that provides input to the computing environment (1100). For audio, the input device(s) (1150) may be a sound card or similar device that accepts audio input in analog or digital form, or a CD-ROM reader that provides audio samples to the computing environment. The output device(s) (1160) may be a display, printer, speaker, CD-writer, or another device that provides output from the computing environment (1100).

The communication connection(s) (1170) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The digital media processing techniques herein can be described in the general context of computer-readable media. Computer-readable media are any available media that can be accessed within a computing environment. By way of example, and not limitation, with the computing environment (1100), computer-readable media include memory (1120), storage (1140), communication media, and combinations of any of the above.

The digital media processing techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," ".generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of multi-media signal processing using a processor, the method comprising using the processor to perform actions of:
   separating an input multi-media signal into possibly overlapping data blocks; and
   applying a fixed-point approximation of an ideal linear transformation to at least some of the blocks, where the fixed-point approximation of the ideal linear transformation is structured as a decomposition of the ideal linear transformation formed by factoring one or more parts of the ideal linear transformation into a cascade of simpler transformations, the simpler transformations comprising one or more primitive operations that can be performed by a multiplication of the input data by a constant fixed-point number, where the value of one or more of the constant fixed-point numbers differs from the closest fixed-point approximation of an ideal constant multiplier value in the simpler transformation in a manner having the effect of increasing the precision of the approximation relative to the ideal linear transformation.

2. The method of claim 1 wherein at least one ideal constant multiplier value in the simpler transformation is a function of two constant values of the ideal linear transformation, the value of the constant fixed-point number being derived as the function of closest fixed-point approximations of the two constant values of the ideal linear transformation, and differing from the closest fixed-point approximation of the function of the two constant values.

3. The method of claim 1 in which the ideal linear transformation is an inverse discrete cosine transformation.

4. The method of claim 3 in which the ideal linear transformation is an LLM decomposition.

5. The method of claim 4 in which the constant fixed-point numbers of the simpler transformation into which the approximation is structured include:

$$\begin{bmatrix} E0 \\ E1 \\ E2 \end{bmatrix} = \begin{bmatrix} 15136 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16820 \\ 25172 \\ 12300 \\ 7373 \\ 20996 \\ 16069 \\ 3197 \\ 9633 \end{bmatrix}.$$

6. The method of claim 3 in which the ideal linear transformation is an AAN decomposition.

7. The method of claim 1 in which the ideal linear transformation is a forward discrete cosine transformation.

8. The method of claim 7 in which the ideal linear transformation is an LLM decomposition.

9. The method of claim 7 in which the constant fixed-point numbers of the simpler transformation into which the approximation is structured include:

$$\begin{bmatrix} E0 \\ E1 \\ E2 \end{bmatrix} = \begin{bmatrix} 15136 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16820 \\ 25172 \\ 12300 \\ 7373 \\ 20996 \\ 16069 \\ 3197 \\ 9633 \end{bmatrix}.$$

10. The method of claim 1 in which the ideal linear transformation is a member of the family of W transformations.

11. The method of claim 1 in which the ideal linear transformation is an overlapped block transformation.

12. A multi-media signal processing system comprising:
    means for separating a multi-media signal into block data;
    means for applying a fixed-point approximation of an ideal linear transformation to the block data, the fixed-point approximation structured as a decomposition of the linear transformation into a cascade of simpler transformations comprising one or more primitive operations that can be performed by a multiplication of the input data by a constant fixed-point number, where the value of one or more of the constant fixed-point numbers differs from the closest fixed-point approximation of an ideal constant multiplier value in the simpler transformation in a manner having the effect of increasing the precision of the approximation relative to the ideal linear transformation;
    means for coding the transformed block data into a processed bitstream.

13. The system of claim 12 wherein at least one ideal constant multiplier value in the simpler transformation is a function of two constant values of the ideal linear transformation, the value of the constant fixed-point number being derived as the function of closest fixed-point approximations of the two constant values of the ideal linear transformation, and differing from the closest fixed-point approximation of the function of the two constant values.

14. The system of claim 13 in which the ideal linear transformation is an inverse discrete cosine transformation.

15. The system of claim 14 in which the ideal linear transformation is an LLM decomposition.

16. The system of claim 15 in which the constant fixed-point numbers of the simpler transformation into which the approximation is structured include:

$$\begin{bmatrix} E0 \\ E1 \\ E2 \end{bmatrix} = \begin{bmatrix} 15136 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16820 \\ 25172 \\ 12300 \\ 7373 \\ 20996 \\ 16069 \\ 3197 \\ 9633 \end{bmatrix}.$$

17. A computer readable storage medium having programming instructions of a multi-media signal processing program stored thereon that is executable on a processor of a signal processing system to process a digital multimedia signal according to a method comprising:

separating an input multi-media signal into possibly overlapping data blocks; and applying a fixed-point approximation of an ideal linear transformation to at least some of the blocks, where the fixed-point approximation of the ideal linear transformation is structured as a decomposition of the ideal linear transformation formed by factoring one or more parts of the ideal linear transformation into a cascade of simpler transformations, the simpler transformations comprising one or more primitive operations that can be performed by a multiplication of the input data by a constant fixed-point number, where the value of one or more of the constant fixed-point numbers differs from the closest fixed-point approximation of an ideal constant multiplier value in the simpler transformation in a manner having the effect of increasing the precision of the approximation relative to the ideal linear transformation.

18. The computer readable storage medium of claim 17 wherein at least one ideal constant multiplier value in the simpler transformation is a function of two constant values of the ideal linear transformation, the value of the constant fixed-point number being derived as the function of closest fixed-point approximations of the two constant values of the ideal linear transformation, and differing from the closest fixed-point approximation of the function of the two constant values.

19. The computer readable storage medium of claim 18 in which the ideal linear transformation is an inverse discrete cosine transformation.

20. The computer readable storage medium of claim 19 in which the ideal linear transformation is an LLM decomposition.

21. The computer readable storage medium of claim 20 in which the constant fixed-point numbers of the simpler transformation into which the approximation is structured include:

$$\begin{bmatrix} E0 \\ E1 \\ E2 \end{bmatrix} = \begin{bmatrix} 15136 \\ 4433 \\ 6270 \end{bmatrix}$$

$$\begin{bmatrix} D0 \\ D1 \\ D2 \\ D3 \\ D4 \\ D5 \\ D6 \\ D7 \\ D8 \end{bmatrix} = \begin{bmatrix} 2446 \\ 16820 \\ 25172 \\ 12300 \\ 7373 \\ 20996 \\ 16069 \\ 3197 \\ 9633 \end{bmatrix}.$$

* * * * *